US008613080B2

(12) United States Patent
Wysopal et al.

(10) Patent No.: US 8,613,080 B2
(45) Date of Patent: Dec. 17, 2013

(54) ASSESSMENT AND ANALYSIS OF SOFTWARE SECURITY FLAWS IN VIRTUAL MACHINES

(75) Inventors: Christopher J. Wysopal, Concord, MA (US); Matthew P. Moynahan, Gloucester, MA (US); Jon R. Stevenson, Sudbury, MA (US)

(73) Assignee: Veracode, Inc., Burlington, MA (US)

( * ) Notice: Subject to any disclaimer, the term of this patent is extended or adjusted under 35 U.S.C. 154(b) by 60 days.

(21) Appl. No.: 13/154,576

(22) Filed: Jun. 7, 2011

(65) Prior Publication Data

US 2012/0072968 A1 Mar. 22, 2012

Related U.S. Application Data

(63) Continuation-in-part of application No. 12/884,544, filed on Sep. 17, 2010, which is a continuation-in-part of application No. 12/819,627, filed on Jun. 21, 2010, which is a continuation-in-part of application No. 12/031,918, filed on Feb. 15, 2008, now Pat. No. 8,499,353.

(60) Provisional application No. 61/243,735, filed on Sep. 18, 2009, provisional application No. 61/352,079, filed on Jun. 7, 2010, provisional application No. 60/901,874, filed on Feb. 16, 2007.

(51) Int. Cl.
*H04L 29/06* (2006.01)

(52) U.S. Cl.
USPC .............................................. 726/19; 726/22

(58) Field of Classification Search
USPC ...................................................... 726/19, 22
See application file for complete search history.

(56) References Cited

U.S. PATENT DOCUMENTS

| | | | |
|---|---|---|---|
| 4,527,237 | A | 7/1985 | Frieder et al. |
| 4,533,997 | A | 8/1985 | Furgerson |
| 4,931,928 | A | 6/1990 | Greenfeld |
| 5,263,162 | A | 11/1993 | Lundeby |
| 5,325,531 | A | 6/1994 | McKeeman et al. |

(Continued)

FOREIGN PATENT DOCUMENTS

| | | | |
|---|---|---|---|
| WO | WO-0186427 | A2 | 11/2001 |
| WO | WO-2004003706 | A2 | 1/2004 |
| WO | WO-2008103286 | A2 | 8/2008 |
| WO | WO-2009097610 | A1 | 8/2009 |

OTHER PUBLICATIONS

Ahpah Software, Inc. SourceAain and Java Decompilation—Updated Dec. 9, 2001. White Paper: SourceAgain and Java Decompilation retrieved from http://www.ahpah.com/whitepaper.html on Dec. 4, 2002.

(Continued)

*Primary Examiner* — Jeffrey Pwu
*Assistant Examiner* — Thong Truong
(74) *Attorney, Agent, or Firm* — Goodwin Procter LLP

(57) ABSTRACT

Security analysis and vulnerability testing results are "packaged" or "bound to" the actual software it describes. By linking the results to the software itself, downstream users of the software can access information about the software, make informed decisions about implementation of the software, and analyze the security risk across an entire system by accessing all (or most) of the reports associated with the executables running on the system and summarizing the risks identified in the reports.

16 Claims, 12 Drawing Sheets

(56) References Cited

U.S. PATENT DOCUMENTS

| | | | |
|---|---|---|---|
| 5,432,942 | A | 7/1995 | Trainer |
| 5,481,708 | A | 1/1996 | Kukol |
| 5,586,328 | A | 12/1996 | Caron et al. |
| 5,590,330 | A | 12/1996 | Coskun et al. |
| 5,715,403 | A | 2/1998 | Stefik |
| 5,793,374 | A | 8/1998 | Guenter et al. |
| 5,812,851 | A | 9/1998 | Levy et al. |
| 5,819,097 | A | 10/1998 | Brooks et al. |
| 5,854,924 | A | 12/1998 | Rickel et al. |
| 5,854,929 | A | 12/1998 | Van Praet et al. |
| 5,862,382 | A | 1/1999 | Kataoka |
| 5,864,871 | A | 1/1999 | Kitain et al. |
| 5,875,334 | A | 2/1999 | Chow et al. |
| 5,881,290 | A | 3/1999 | Ansari et al. |
| 5,892,900 | A | 4/1999 | Ginter et al. |
| 5,918,035 | A | 6/1999 | Van Praet et al. |
| 5,933,635 | A | 8/1999 | Holzle et al. |
| 5,937,190 | A | 8/1999 | Gregory et al. |
| 5,937,192 | A | 8/1999 | Martin |
| 6,009,256 | A | 12/1999 | Tseng et al. |
| 6,014,518 | A | 1/2000 | Steensgaard |
| 6,026,485 | A | 2/2000 | O'Connor et al. |
| 6,064,819 | A | 5/2000 | Franssen et al. |
| 6,071,317 | A | 6/2000 | Nagel |
| 6,078,745 | A | 6/2000 | De Greef et al. |
| 6,125,439 | A | 9/2000 | Tremblay et al. |
| 6,151,701 | A | 11/2000 | Humphreys et al. |
| 6,151,706 | A | 11/2000 | Lo et al. |
| 6,154,876 | A | 11/2000 | Haley et al. |
| 6,175,948 | B1 | 1/2001 | Miller et al. |
| 6,240,376 | B1 | 5/2001 | Raynaud et al. |
| 6,240,547 | B1 | 5/2001 | Holzle et al. |
| 6,243,848 | B1 | 6/2001 | Guignet et al. |
| 6,249,910 | B1 | 6/2001 | Ju et al. |
| 6,311,327 | B1 | 10/2001 | O'Brien et al. |
| 6,336,087 | B2 | 1/2002 | Burgun et al. |
| 6,381,738 | B1 | 4/2002 | Choi et al. |
| 6,412,106 | B1 | 6/2002 | Leask et al. |
| 6,457,172 | B1 | 9/2002 | Carmichael et al. |
| 6,594,761 | B1 | 7/2003 | Chow et al. |
| 6,601,235 | B1 | 7/2003 | Holzle et al. |
| 6,631,473 | B2 | 10/2003 | Townsend |
| 6,668,325 | B1 | 12/2003 | Collberg et al. |
| 6,766,481 | B2 | 7/2004 | Estep et al. |
| 6,779,114 | B1 | 8/2004 | Chow et al. |
| 6,820,256 | B2 | 11/2004 | Fleehart et al. |
| 6,892,303 | B2 | 5/2005 | Le Pennec et al. |
| 6,925,638 | B1 | 8/2005 | Koved et al. |
| 6,928,638 | B2 | 8/2005 | Parvathala et al. |
| 6,961,925 | B2 | 11/2005 | Callahan, II et al. |
| 6,980,927 | B2 | 12/2005 | Tracy et al. |
| 7,051,322 | B2 | 5/2006 | Rioux |
| 7,089,590 | B2 | 8/2006 | Judge et al. |
| 7,140,008 | B2 | 11/2006 | Chilimbi et al. |
| 7,155,708 | B2 | 12/2006 | Hammes et al. |
| 7,162,473 | B2 | 1/2007 | Dumais et al. |
| 7,171,655 | B2 | 1/2007 | Gordon et al. |
| 7,185,323 | B2 | 2/2007 | Nair et al. |
| 7,266,813 | B2 | 9/2007 | Nistler et al. |
| 7,284,274 | B1 | 10/2007 | Walls et al. |
| 7,315,903 | B1 | 1/2008 | Bowden |
| 7,376,939 | B1 | 5/2008 | Nayak et al. |
| 7,389,208 | B1 | 6/2008 | Solinsky |
| 7,430,670 | B1 | 9/2008 | Horning et al. |
| 7,437,764 | B1 * | 10/2008 | Sobel et al. .................... 726/22 |
| 7,458,067 | B1 | 11/2008 | Tirumalai et al. |
| 7,548,946 | B1 | 6/2009 | Saulpaugh et al. |
| 7,594,269 | B2 | 9/2009 | Durham et al. |
| 7,707,566 | B2 | 4/2010 | Grover et al. |
| 7,743,336 | B2 | 6/2010 | Louch et al. |
| 7,752,609 | B2 | 7/2010 | Rioux |
| 7,779,394 | B2 | 8/2010 | Homing et al. |
| 7,779,472 | B1 | 8/2010 | Lou |
| 7,840,845 | B2 | 11/2010 | Doddapaneni et al. |
| 7,840,951 | B1 | 11/2010 | Wright et al. |
| 7,856,624 | B2 | 12/2010 | Plum |
| 7,874,001 | B2 | 1/2011 | Beck et al. |
| 7,891,003 | B2 | 2/2011 | Mir et al. |
| 7,930,753 | B2 | 4/2011 | Mellinger et al. |
| 7,937,693 | B2 | 5/2011 | Victorov |
| 8,069,487 | B2 | 11/2011 | Fanton et al. |
| 8,087,067 | B2 | 12/2011 | Mahaffey et al. |
| 8,108,933 | B2 | 1/2012 | Mahaffey |
| 8,136,104 | B2 | 3/2012 | Papakipos et al. |
| 8,161,464 | B2 | 4/2012 | Archambault et al. |
| 8,161,548 | B1 * | 4/2012 | Wan ................................ 726/22 |
| 8,171,553 | B2 | 5/2012 | Aziz et al. |
| 8,181,251 | B2 | 5/2012 | Kennedy |
| 8,225,409 | B2 | 7/2012 | Newman et al. |
| 8,272,058 | B2 | 9/2012 | Brennan |
| 8,281,290 | B2 | 10/2012 | Thompson |
| 8,290,245 | B2 | 10/2012 | Turbell et al. |
| 8,332,944 | B2 | 12/2012 | Rozenberg et al. |
| 8,347,386 | B2 | 1/2013 | Mahaffey et al. |
| 8,365,155 | B2 | 1/2013 | Rioux |
| 2001/0020272 | A1 | 9/2001 | Le Pennec et al. |
| 2004/0073445 | A1 | 4/2004 | Mellinger et al. |
| 2004/0102923 | A1 | 5/2004 | Tracy et al. |
| 2004/0267700 | A1 | 12/2004 | Dumais et al. |
| 2005/0108037 | A1 | 5/2005 | Bhimani et al. |
| 2005/0138426 | A1 | 6/2005 | Styslinger |
| 2006/0021055 | A1 | 1/2006 | Judge et al. |
| 2006/0095967 | A1 | 5/2006 | Durham et al. |
| 2006/0136424 | A1 | 6/2006 | Nuggehalli et al. |
| 2006/0190769 | A1 | 8/2006 | Doddapaneni et al. |
| 2006/0218639 | A1 | 9/2006 | Newman et al. |
| 2006/0277607 | A1 | 12/2006 | Chung |
| 2007/0022287 | A1 * | 1/2007 | Beck et al. .................... 713/164 |
| 2007/0101433 | A1 | 5/2007 | Louch et al. |
| 2007/0180490 | A1 | 8/2007 | Renzi et al. |
| 2007/0240218 | A1 | 10/2007 | Tuvell et al. |
| 2007/0261061 | A1 | 11/2007 | Staniford et al. |
| 2007/0294766 | A1 | 12/2007 | Mir et al. |
| 2008/0005782 | A1 | 1/2008 | Aziz |
| 2008/0204763 | A1 | 8/2008 | Turbell et al. |
| 2008/0209567 | A1 | 8/2008 | Lockhart et al. |
| 2009/0165135 | A1 | 6/2009 | Lomont et al. |
| 2010/0031353 | A1 | 2/2010 | Thomas et al. |
| 2010/0058474 | A1 | 3/2010 | Hicks |
| 2010/0058475 | A1 | 3/2010 | Thummalapenta et al. |
| 2010/0281248 | A1 | 11/2010 | Lockhart et al. |
| 2011/0047594 | A1 | 2/2011 | Mahaffey et al. |
| 2011/0145920 | A1 | 6/2011 | Mahaffey et al. |
| 2011/0173693 | A1 | 7/2011 | Wysopal et al. |
| 2012/0072968 | A1 | 3/2012 | Wysopal et al. |
| 2012/0117650 | A1 | 5/2012 | Nachenberg |
| 2012/0174224 | A1 | 7/2012 | Thomas et al. |
| 2013/0097706 | A1 | 4/2013 | Titonis et al. |

OTHER PUBLICATIONS

Ahpah Software, Inc. SourceAgain PC Professional, Ahpah Software, Inc. / SourceAgain PC Professional retrieved from http://www.ahpah.com/sourceagain/sourceagain.sub.--professional.html on Dec. 4, 2002.

Backer Street Software. REC—Reverse Engineering Compiler. REC Decompiler Home Page retrieved from http://www.backerstreet.com/rec/rec.htm on Dec. 3, 2002.

Blume, W. & Eigenmann, R., "Demand-driven Symbolic Range Propagation", University of Illinois Urbana-Champaign, 1-15 (1995).

Blume, W.J., "Symbolic Analysis Techniques for Effective Automatic Parallelization", University of Illinois at Urbana-Champaign (1995).

Bohme, Rainer "A Comparison of Market Approaches to Software Vulnerability Disclosure", Springer-Verlag Berlin Heidelberg, 2006 (14 pages).

Breuer et al, "Decompilation: The enumeration of types and grammars", ACM Trans. on Prog. Lang. and Sys. vo. 16, No. 5, pp. 1613-1647, 1994.

Breuer, P.T. and Bowen, J.P., (1992d), "Generating Decompilers", Draft, Oxford University Computing Laboratory. Submitted for Publication.

(56) References Cited

OTHER PUBLICATIONS

Burke, "An interval based approach to exaustive and incremental interprocedural data flow analysis", ACM Trans. on Prog. Language and Systems, vol. 12, No. 3, pp. 341-395, 1990.
Business Wire, "The Kernel Group Unveils Java Support for AutoTracel Serviceability Solution Expands Capabilities; Provides Java Support and Key Features that Extend its Power and Flexibility", Jun. 4, 2001.
Choi, J.D. & Ferrante, J., "Static Slicing in the Presence of GOTO Statements", IBM T.J. Watson Research Center.
Cifuentes, C., "An Environment for the Reverse Engineering of Executable Programs", Proceedings of the Asia-Pacific Software Engineering Conference (APSEC), IEEE Computer Society Press, Brisbane, Australia, pp. 41-419, Dec. 1995.
Cifuentes, C., "Partial Automation of an Integrated Reverse Engineering Environment of Binary Code", Proceedings Third Working Conference on Reverse Engineering, Monterey, CA, IEEE—CS Press, pp. 50-56, Nov. 8-10, 1996.
Cifuentes, C., "Reverse Compilation Techniques", Queensland University of Technology (Jul. 1994).
Cifuentes, C. et al., "Assembly to High-Level Language Translation", University of Queensland, Brisbane, Australia, Dept. of Comp. Sci. & Elec. Eng., Technical Report 439, Aug. 1993.
Cifuentes, C. et al., "The Design of a Resourceable and Retargetable Binary Translator", University of Queensland, Dept. Comp. Sci. & Elec. Eng. & Ramsey, N., University of Virginia, Dept. Comp. Sci.
Cifuentes, C. & Fraboulet, A., "Intraprocedural Static Slicing of Binary Executables", University of Queensland, Dept. Comp. Sci., Centre for Software Maintenance.
Cifuentes, C. & Gough, K.J., "Decompilation of Binary Programs", Software—Practice and Experience, vol. 25, pp. 811-829, Jul. 1995.
Cifuentes, C. & Sendall, S., "Specifying the Semantics of Machine Instructions", University of Queensland, Dept. Comp. Sci. & Elec. Eng., Technical Report 442, Dec. 1997.
Cifuentes, C. & Simon, D., "Precedural Abstration Recovery from Binary Code", University of Queensland, Dept. Comp. Sci. & Elec. Eng., Technical Report 448, Sep. 1999.
Cifuentes, C. & Van Emmerik, M., "Recovery of Jump Table Case Statements from Binary Code", University of Queensland, Dept. Comp. Sci. & Elec. Eng., Technical Report 444, Dec. 1998.
Cytron, R. et al., "Efficiently Computing Static Single Assignment Form and the Control Dependence Graph", IBM Research Division, Mar. 7, 1991.
Dejean et al, "A definition optimization technique used in a code translation algorithm", Comm.. of the ACM, vol. 32, No. 1, pp. 94-105, 1989.
Di Lucca Guiseppe A., et al. "Testing Web-based applications: The state of the art and future trends" Information and Software Technology, 2006 (pp. 1172-1186).
Duesterwald et al, "A demand driven analyzer for data flow testing at the integration level", IEEE ICSE, pp. 575-584, 1996.
Duesterwald, E. et al., "A Practical Framework for Demand-Driven Interprocedural Data Flow Analysis", ACM Transactions on Programming Languages and Systems 19, pp. 992-1030, Nov. 1997.
Dyer, D. Java decompilers compared ; Our detailed examples of how 3 top decompilers handle an extensive test suite will help you determine which, if any, meet your needs. JavaWorld (Jul. 1997).
Gough, I., Queensland University of Technology & Klaeren, H., University of Tubingen, "Eliminating Range Checks using Static Single Assignment Form", Dec. 19, 1994.
Gupta, R., University of Pittsburgh, "Optimizing Array Bound Checks Using Flow Analysis", ACM SIGPLAN Conference on Programming Language Design and Implementation, White Plains, NY, Preliminary Version (1995).
Harrold, M.J. & Soffa, M.L., "Efficient Computation of Interprocedural Definition-Use Chains", ACM Transactions on Programming Language and Systems 16, 175-204 (Mar. 1994).
Hollingum, J., "Arithmetic robot modules control robotic production", Industrial Robot 22, 32-35 (1995).
International Search Report for PCT/US2008/002025, mailing date Sep. 2, 2008 ( 4 pages).
Kumar, S., "DisC—Decompiler for TurboC": http://www.debugmode.com/dcompile/disc.htm modified Oct. 22, 2001.
Liang, D. & Harrold, M.J., "Efficient Computation of Parameterized Pointer Information for Interprocedural Analyses", Georgia Institute of Technology, Tech Report GIT-CC-00-35, 1-17 (Dec. 2000).
Liang, D. & Harrold, M.J., "Light-Weight Context Recovery for Efficient and Accurate Program Analyses", Proceedings of the 22nd International Conference on Software Engineering 1-10 (Jun. 2000).
MacUser, Programming & systems; Software Review; software for the Apple Macintosh computer, Evaluation, vol. 8, 237 (Jan. 1993).
Mittal et al, "Automatic translation of software binaries onto FPGAs", ACM DAC, pp. 389-394, 2004.
Mycroft, A., "Type-Based Decompilation", Cambridge University, Computer Laboratory.
Myreen et al, "Machine code verification for multiple architectures" IEEE, pp. 1-8, 2008.
Orso, A. et al., "Effects of Pointers on Data Dependences", Georgia Institute of Technology, College of Computing, Technical Report GIT-VV-00-33, 1-17 (Dec. 2000).
Partial International Search Report for EP12184590.3 dated May 10, 2013, 7 pages.
Patterson, J.R.C., "Accurate Static Branch Prediction by Value Range Propagation", Proc. ACM SIGPLAN Conference on Programming Language and Design Implementation, La Jolla, San Diego, 67-78 (Jun. 1995).
Pingali, K. & Bilardi G., "Optimal Control Dependence Computation and the Roman-Chariots Problem", ACM Transactions on Programming Languages and Systems 19, 1-30 (May 1997).
Reilly, D., "Decompilers—friend or foe?", Java Coffee Break updaed Jun. 2, 2001 retrieved from http://www.javacoffeebreak.com/articles/decompilers.sub.--friend.sub.--or- .sub.--foe.html.
Sagiv, M. et al. Precise Interprocedure Dataflow Analysis with Applications to Constant Propagation. University of Wisconsin-Madison, Computer Sciences Dept.
Saul, J. M. Hardware/Software Codesign fir FPGA-Based Systems. Proceedings of the 32.sup.nd Hawaii International Conference on System Sciences (1999).
Sinha, S. & Harold, M.J., "Analysis and Testing of Programs with Exception-Handling Constructs", IEEE Transactions on Software Eng. 26, 1-24 (Sep. 2000).
Stitt et al, "New decompilation techniques for binary level co-processor generation", IEEE, pp. 546-553, 2005.
University of Queensland, Comp. Sci & Elec. Eng., The dcc Decompiler, updated on May 4, 2002, retrieved from http://itee.uq.edu.au/.about.cristina/dcc.html on Dec. 4, 2002.
Ural et al, "Modeing software for acurate data flow representaion", IEEE, pp. 277-286, 1993.
Van Emmerik, M. Signatures for Library Functions in Executable Files. Queensland University of Technology, Information Security Research Centre.
Van Tyle, S., "Engineering software tools meet demands", Electronic Design 42, 71 (Jun. 27, 1994).
Written Opinion of the International Searching Authority for PCT/US2008/002025 mailing date Sep. 2, 2008 (6 pages).
Xu et al, "Dynamic purity analysis for Java programs", ACM Paste, pp. 75-82, 2007.
Yardimci et al, "Mostly static program partitioning of binary executables", ACM Trans. on Prog.Lang. and Sys. vo. 31, No. 5, article 7, pp. 1-46, 2009.

* cited by examiner

ASSESSMENT AND ANALYSIS OF SOFTWARE SECURITY FLAWS IN VIRTUAL MACHINES

CROSS-REFERENCE TO RELATED APPLICATIONS

This application is a continuation-in-part of and claims priority to and the benefits of U.S. patent application Ser. No. 12/884,554, filed on Sep. 17, 2010, which claims priority to and the benefit of U.S. provisional patent application Ser. No. 61/243,735, filed on Sep. 18, 2009, and is a continuation-in-part of and claims priority to U.S. patent application Ser. No. 12/819,627, filed on Jun. 21, 2010, which itself is a continuation-in-part of and claims priority to U.S. patent application Ser. No. 12/031,918, filed on Feb. 15, 2008, which claims priority to and the benefits of U.S. provisional patent application Ser. No. 60/901,874, filed on Feb. 16, 2007. This application also claims priority to and the benefit of U.S. provisional patent application Ser. No. 61/352,079, filed on Jun. 7, 2010.

FIELD OF THE INVENTION

The invention relates generally to systems and techniques for analyzing computer code, and more particularly to determine whether the computer code representing a virtual machine contains security flaws or is vulnerable to known security threats.

BACKGROUND

In recent years, many companies and government agencies have been exposed to negative press and legal proceedings due to high-profile security breaches in which sensitive data has been either inadvertently disclosed or stolen. While many of these incidents were the result of human error, a significant percentage was traced back to poorly designed software architecture and/or applications. Conventional techniques for testing software applications can identify many vulnerabilities, but no one methodology is failsafe. Furthermore, although many security-analysis techniques require significant time and resources to administer, not every application necessitates the same level or degree of analysis.

As a result, companies face a difficult trade-off between the desire to test software and limitations on available resources and time. Moreover, many companies do not have the expertise to apply some of the more intricate and complex security assessment techniques, and thus look to industry experts for such services. This creates yet another challenge, in that often what is being tested is highly sensitive, proprietary software.

There are a myriad of testing and assessment techniques for validating various properties of software applications and network implementations. However, one of the most critical processes for ensuring that the deployment of software does not expose an organization to unacceptable risks is security and vulnerability testing. Some of the conventional techniques used to perform such testing includes static analysis (automated code review), dynamic analysis (automated penetration testing) and manual analyses such as code review, design review, and manual penetration testing. All of these analysis techniques are aimed at finding security weaknesses and vulnerabilities in an application and typically provided in report format to the programmers, product managers and quality assurance (QA) staff. The report can provide detailed results (e.g., program names, line numbers, variable names, data connections, etc.) as well as a summary of the results. The report may be a conventional document such as a text file or a structured XML file.

However, once the report is run and reviewed by a QA engineer or product manager, it is typically no longer referenced or used. Furthermore, as an executable or application is implemented and/or provided to a customer, the report is forever decoupled from the software that was tested. In fact, an individual or organization using software has no knowledge that a report was ever created or used to analyze the software they are now using. As such, valuable information about what aspects of the application were tested, how secure certain features or functions may be and what testing methodologies were used are unknown to those that value such information.

Another trend in systems engineering is the use of so-called "virtual machines." Generally, a virtual machine (or "VM") refers to completely isolated operating system installation within a normal operating system, which may be implemented either using software emulation or hardware virtualization. More specifically, virtual machine is a software implementation of a physical machine (i.e., a computer) that executes programs in the same manner as the machine itself. VMs utilize an "image file" to store a snapshot of a complete computer system, including all required information describing the computer system such as the operating system, applications, data and all configuration information.

Virtual machines are typically separated into two major categories based on their use and degree of correspondence to a real machine. A system virtual machine provides a complete system platform which supports the execution of a complete operating system, such as Linux or Windows. In contrast, a process virtual machine is designed to run a single program, essentially supporting a single process. An essential characteristic of a virtual machine is that the software running inside is limited to the resources and abstractions provided by the virtual machine. As such, the "file" containing the VM is a complete and closed environment.

What is needed, therefore, is a system and associated techniques that can produce vulnerability and security test reports using various testing methodologies for virtual machines.

SUMMARY OF THE INVENTION

In general, the present invention facilitates security assessment and vulnerability testing of an entire system as instantiated as a virtual machine, including the operating system and registry state, the application suite operating within the system, and the data and control flows among the applications. This testing may be done in a manner responsive to the technical characteristics and the business context in which the virtual machine will be implemented (collectively, "implementation metadata"). The invention may, for example, determine an appropriate assurance level and test plan to attain it. In many instances, a test plan may dictate performance of different types of analyses. In such cases, the individual tasks of each test are combined into a "custom" or "application-specific" workflow, and the results of each test may be correlated with other results to identify a wide range of potential vulnerabilities and/or faults that are detected by the different tests. As such, a programmer reviewing the results can better understand how different potential vulnerabilities may relate to each other or in fact be caused by a common flaw.

Furthermore, once a virtual machine is created and implemented, the universe of threats that may impact the operating system and/or applications executing within the machine continues to expand, and therefore the platform preferably provides the infrastructure and methods for continuous, periodic or event-triggered security assessments, even as the virtual machine operates in a secure production environment. Users and/or owners may simultaneously view both the "infrastructure" (e.g., source code, architectural components, object code abstractions, user case diagrams, UML diagrams, and/or website maps) as it exists in the virtual machine and the results of the periodic security assessments, which can remain stored within the analysis platform. For example, in one implementation, the analysis platform runs on a server accessible to the owner r via the Internet. The server periodically uploads (or otherwise accesses) the file containing the virtual machine, starts the machine within the appropriate environment, performs a security analysis, and alerts the user to the results. Owners and/or users may access the results of this and previous assessments, which are stored on (or retrievable by) the server.

Accumulating both implementation metadata and security analysis and assessment results for numerous virtual machines of differing technical profiles from many companies facilitates benchmarking at many levels within an organization. Use of various "anonymizing" and "scrubbing" techniques (i.e., removing any information that could be deemed proprietary and/or identify an owner) permits the sharing of assessment data among otherwise unrelated entities. Benchmarking may take place on a global scale (i.e., across all virtual machines being monitored), within particular subsets of virtual machines (e.g., those from a specific industry and/or working with a specific technology), or based on personnel (e.g., for a particular developer, team, organization or company).

In a first aspect, a computer-implemented method of identifying vulnerabilities of a collection of software programs compiled into a virtual machine image includes receiving an image file representing a computer system as a virtual machine and analyzing the image for potential vulnerabilities. More specifically, the image file includes one or more of operating system information, application(s), an application server, application data, and/or configuration information. The image file is loaded into a computer memory and executed such that the virtual machine is executed on a processor. The executed image file is then analyzed to obtain a listing of potential vulnerabilities.

The analysis may further include extracting files of the virtual machine from the image file and identifying at least one installed application within the virtual machine. Files related to the installed application are identified and separated, and, using a vulnerability database, potential vulnerabilities of each separated file are identified. In some embodiments, detecting potential vulnerabilities may include building a control flow model and/or a data flow model of the separated files and detecting the potential vulnerabilities by scanning the models. Analysis techniques may include inspecting an operating system and/or registry files configuration to detect potential vulnerabilities.

In instances in which multiple applications are included in the virtual machine, the interactions among the applications may be analyzed. This may include, for example, building an interaction control flow model and/or data flow model among the installed applications, and detecting potential vulnerabilities by scanning the interaction models. The analysis may also include scanning the executing image file (and, in some cases, executing applications within the virtual machine) using a network vulnerability scanner and/or a host vulnerability scanner.

In cases in which an application is executing within the virtual machine, the analysis may include connecting to the application, providing input to the application, and inspecting a response from the executing application to the input to detect potential vulnerabilities. The input may be test input, user credentials, user interface navigational input, and/or user input. In some instances, fuzz testing may be performed on the executing application by sending test data to the executing application through a network port and inspecting a response of the executing application to the test data to detect potential vulnerabilities. If the executed application does not respond to the test data, the image file may be re-executed and reloaded until the test data produces a result. The potential vulnerabilities identified during the scan may then be added to the list of potential vulnerabilities.

A security report may be compiled from the list of potential vulnerabilities. In some instances, a score may be computed based on the report and compared with scores from prior implementations of the virtual machine and/or other virtual machines tested in a similar fashion. The score may be based on a validation policy to which the security report is compared, and the comparison may result in a set of security data that, in some cases, may be associated with the image file using a secure hash, digital signature, or other method.

In another aspect, a system is provided for analyzing vulnerabilities of a virtual machine represented using an image file. The system includes a load-execute module to load and execute the virtual machine represented by the image file and a file extractor to extract files included in the image file. An analyzer to identifies the flow of information among the extracted files and a profiler detects potential vulnerabilities of each identified flow. A scanner detects potential vulnerabilities in the executing virtual machine, and a reporter combines the detected vulnerabilities into a security report comprising a listing of potential vulnerabilities and produces a security score. A validator compares the security report with a validation policy and to associates security data with the image file.

In some cases, the system also includes an application identifier to identify applications installed within the virtual machine and an interaction analyzer to identify flow of information among the identified applications. A tester tests the executing applications by providing test data to the applications and detects potential vulnerabilities by analyzing responses of the executing application to the provided test data.

In another aspect, a method of authenticating a virtual machine includes sending an image file representing a computer system as a virtual machine to a security analyzer and receiving security data from the security analyzer. The security data is analyzed with reference to a security policy to determine compliance of the represented computer system with the security policy. If the computer system is determined to be compliant, the image file is loaded and executed to implement the represented computer system as a virtual machine.

The security data may, in some instances, include a security signature, and in such cases the authenticity of the security signature is determined. In other implementations, the security data is in the form of a security report, which may be compared to the security policy.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention

DETAILED DESCRIPTION

Architecture and Approach

Figure 1:
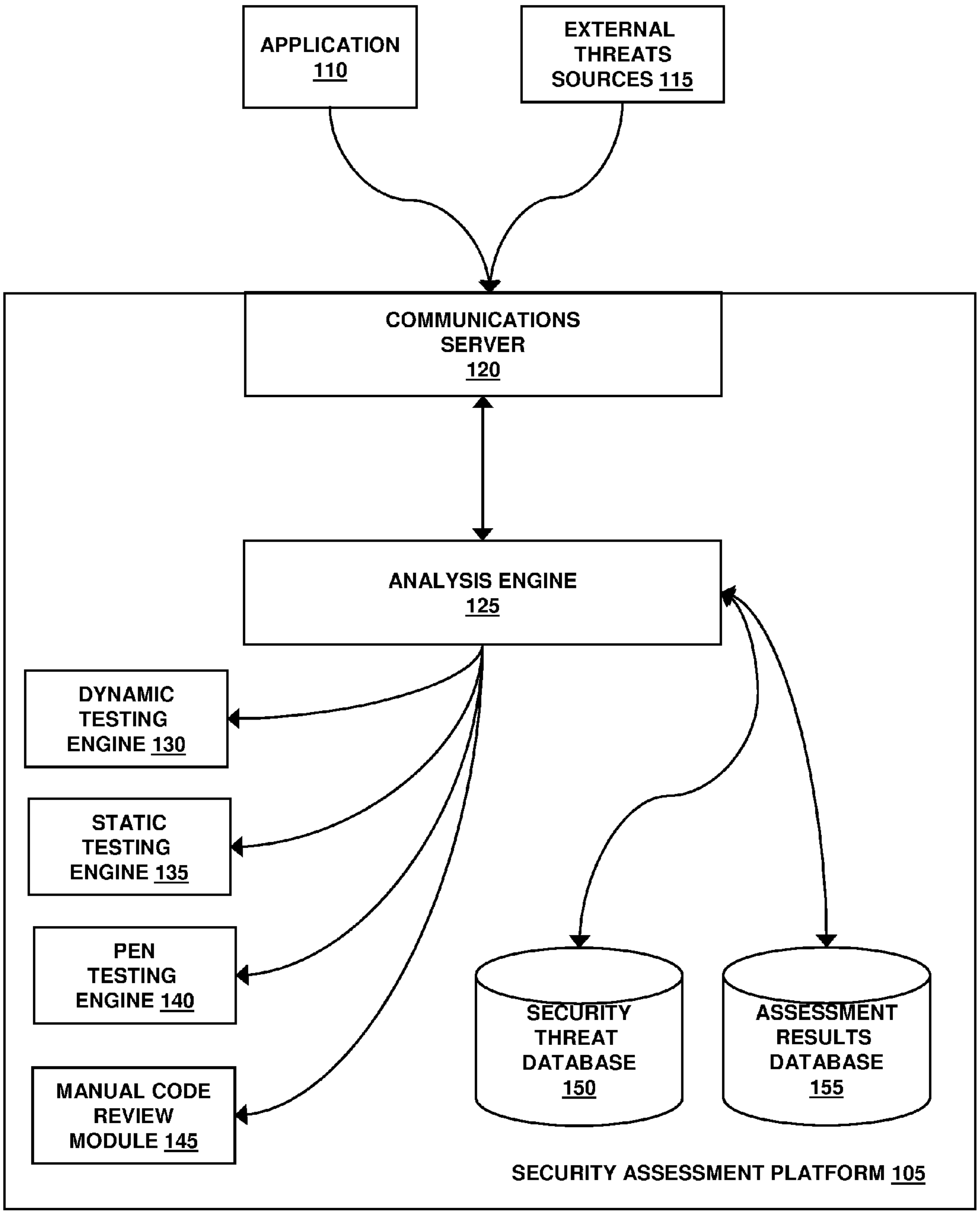
FIG. 1 is a block diagram of a software assessment and testing domain according to an embodiment of the invention.

The techniques and supporting systems described herein provide a comprehensive and customizable approach to detecting security flaws in an entire computational environment implemented as a virtual machine. The technique recommends remedial courses of action, and provides reporting and benchmarking against, for example, industry-wide statistics, other developers and/or other development teams from within or outside of an organization. The virtual machine may include (but is not necessarily limited to) an instantiation of one or more operating systems, applications, databases as well as any sort of instructions for a machine, including, for example, without limitation, a component, a class, a library, an script, an applet, a logic table, a data block, or any combination or collection of one or more of any one or more of these. An appropriate level, type and frequency of security analysis needed for a virtual machine may depend on many factors, including (but not necessarily limited to) the technical details of the virtual machine (e.g., the operating system it uses and the platform on which is to be deployed) as well as the business context in which the applications operating within the virtual machine. For example, a virtual machine that includes an application that is "customer-facing" and facilitates high-volume, secure transactions such as banking or ecommerce will require rigorous testing to ensure that customer data is not jeopardized. Conversely, applications such as document-control systems or desktop applications that are implemented entirely within an organization and operated behind secure firewalls require less stringent testing. Therefore, balancing the added costs for executing additional security assessments and testing with the risks of potential for losses is critical FIG. 1 illustrates, in a broad overview, a representative security assessment platform 105 for implementing the techniques described herein. The platform 105 receives and reports on applications 110 (including, in some cases, files representing a virtual machine) from multiple entities, while monitoring numerous sources 115 of external threats for up-to-date libraries of malware and application and environmental vulnerabilities. The platform 105 includes a communications server 120 and an analysis engine 125. The communications server 120 provides the conduit through which the platform interacts with external systems. For example, the communications server 120 may utilize conventional data-communications protocols such as TCP/IP, HTTP and others to query servers for updated programs, download updated programs, post analysis results, and send and receive messages from users. More specifically, in a server-based implementation, the communications server 120 may act as an interface between the platform 105 and external entities that submit software applications and other files for assessment and/or to review assessment results. In addition, the communications server 120 may act as a conduit through which other external data such as updated threat information (in the form of malware definition files, for example) are received for storage in the security threat database 150. In some implementations, the security assessment platform 105 may be configured as a distributed platform, in which one or more components (e.g., testing modules, threat-assessment agents, secure communication devices, databases, etc.) are duplicated and/or distributed among multiple computers located remotely from each other but, for example, co-located with users of the platform. Examples of communications server application platforms providing such features include the Apache HTTP Web Server supplied by the Apache Software Foundation and the WebSphere HTTP Server supplied by IBM Corporation.

The analysis engine 125 receives virtual machine files from a user, either via the entity operating the platform 105 or directly from customers using the platform 105 as a subscription service. The analysis engine 125 interacts with various testing engines and code review modules, as well with assessment and threat databases, and includes benchmarking and reporting capabilities for comparing assessment results among applications, developers, teams and/or organizations. In one embodiment, for example, the analysis engine 125 interacts with a dynamic testing engine 130, a static testing engine 135, a pen testing engine 140 and a module for performing manual code review 145.

In implementations in which the platform is used to analyze a virtual machine, a static analyzer emulates the virtual machine by loading the image into memory and extracting all (or in some cases a predefined subset) of the files within the system. The files may be identified using filenames, signatures, and/or unique file hashes. The configuration and executable files for installed and executing applications are identified and separated. Each application is then sent to a binary/executable static analyzer for security analysis. The analyzer uses a public or private vulnerability database to look for known vulnerabilities in identified applications and operating system components.

As an example, a virtual machine may include a Linux-based operating system, a Java application server, application data, and/or business applications written in Java. The static virtual machine image analyzer inspects the virtual machine image file and identifies the files that make up the OS, the application server and the business applications. The files that make up the business application executable and describe the application's configuration are sent to a binary/executable static analyzer for security analysis. The static analyzer builds a control flow and data flow model of the application and scans the model for security and quality flaws at the code level. If there are multiple business applications on the system, each is sent to the static analyzer for analysis. The application server software and other software components installed on the system are also identified and sent to the static analyzer.

In addition to analyzing the applications installed on the system for security and quality flaws, the security configuration of the system can be analyzed by inspecting the operating system configuration and/or registry files to discover additional vulnerabilities.

In cases where multiple business applications are installed, the system can analyzes of the suite of applications as they interact in a multi-tier or other multi-application/multi-process architecture. The data and control flows within and among the applications are discovered and a multi-application/multi-process model is analyzed for security and quality flaws.

The security analysis of each application and the security analysis of the operating system configuration may be combined into a single package, thus creating an overall security analysis of the entire system.

Static analysis of a virtual machine image file provides an independent security check of an entire system—operating system, infrastructure and applications—that runs in a virtual machine. This check can be done before or after deployment of the system. In most cases, static analysis does not require test data or access to other systems to execute as designed, as the analysis is primarily concerned with application flow independent of specific inputs. As such, a static virtual machine image security analysis may be performed before a virtual machine image is deployed to its production environment.

In addition to static analysis, the virtual machine image may be loaded into the appropriate virtual machine and "started" (executed) to facilitate dynamic analysis. The executing virtual machine can then be analyzed using various network and host vulnerability scanners to identify and quantify known vulnerabilities. If any additional applications are discovered to be running, these too may be subjected to dynamic analysis.

For example, a running web application may be analyzed using a dynamic web application scanner. The web application scanner connects to the web application and tests it by providing test inputs and inspecting the responses, looking for security and quality flaws. If login credentials or application navigation information and sample input data for the web application is known, it can be provided to the web scanner to enhance the coverage of the analysis.

Other discovered running non-web applications may be subjected to fuzz testing (also known as fault injection testing) over network ports or through other inputs such as file inputs. The fuzz testing sends test data to a network port and the response is inspected to determine if a security or quality flaw exists. Fuzz testing can, in some instances, cause the application to stop responding due to a crash or hang if an error or flaw is encountered. In such cases, the virtual machine can be restarted so testing can continue.

The results from the network, host, and individual application scans is compiled into a single scan report to create an overall security score for the entire system. The security score can be compared to scores from other virtual machine or non-virtual machine implementations of a similar configuration to determine how a particular instantiation compares to its peers, or itself over time.

More specifically, the dynamic analysis engine 130 interacts with the applications 110 within the virtual machine as an external entity and executes the application 110 in a manner that mirrors or emulates the runtime environment in which it operates. In some embodiments, the dynamic analysis engine 130 receives a description of the interfaces to the application 110, sends test and/or simulation data to the application via the interfaces, and analyzes the received responses. The test data may be application-specific (e.g., provided with the application as a library, data file, or structured input) or application-agnostic, such as data and/or scripts known to exploit application vulnerabilities. Based on the responses, the dynamic analysis engine 130 determines whether any security defects exist in the application 110 and the extent to which it may be vulnerable to certain threats. The defects may be reported in real-time (e.g., via the communications server 120) and/or stored in a database for subsequent analysis and reporting.

The static analysis engine 135 receives a binary or bytecode version of the application 110 as input. For example, a high-level semantic model of the application 10 is created containing control-flow and data-flow graphs of the application 110, and this model then analyzed for quality defects, including security flaws, by a set of analysis scans.

The pen testing engine 140 performs penetration testing of the application 110. Penetration testing includes, for example, simulating and analyzing various web-based interactions between a client and the server on which the application 110 operates. This includes executing standard HTTP commands such as GET and POST, analyzing FORM elements and scripting elements (both client and server-side), and manipulating inputs to elicit known vulnerabilities.

The analysis engine 125 may also receive input from manual review processes executed using a manual code review module 145. Manual review processes typically include a human operator visually reviewing source code to determine if proper coding form and standards have been followed, and looking for "extra" functions often left in applications such as trap doors, easter eggs, and similar undocumented functionality.

For web-based applications, a dynamic web scan may be used to "crawl" through the application by manually navigating the web site to be tested. In this manner, a person or automated "bot" interacts with all (or some selected subset) of the user interface elements and enters valid data. In some cases, pre-defined invalid data (either in format or substance) may be included to test the application's response. In some cases, an automated testing process such as a regression test harness may also be used. During the crawl, a browser plug-in or a proxy running on the client records all web requests to and responses from the web application. After the crawl has successfully navigated the web application, the recording process is stopped. The recorded requests and responses may be uploaded to the analysis engine 125. In some instances the crawl may be performed by the entity operating the platform 105, whereas in other instances the crawl may be performed by the owner of the application being tested, and the resulting data and application loaded into the platform together.

The data, scripts and functions used to operate the various testing engines and the analysis engine 125 may be stored in a security-threat database 150. The database 150 may be operated as a stand-alone server or as part of the same physical server on which the analysis engine 125 operates. Portions of the threat database 150 may, in some cases, be provided by entities other than the entity operating the platform 105 on a subscription basis, allowing the database 150 to be kept up to date as threats and malware evolve over time. Likewise, the results of each test and the overall analysis process may be stored in an assessment-results database 155. In some embodiments, the applications and analysis results are stored in an encrypted format using a unique key provided to the owner of the analyzed application 110 such that only it can access and review the results of the analysis. In such cases, decryption of the analysis is limited to authorized personnel and all traces of the analysis are deleted from memory (other than the database 155) following completion.

Examples of database applications that may provide the necessary features and services include the MySQL Database Server by Sun Microsystems, the PostgreSQL Database Server by the PostgreSQL Global Development Group of Berkeley, Calif., or the ORACLE Database Server offered by ORACLE Corp. of Redwood Shores, Calif.

Figure 2:
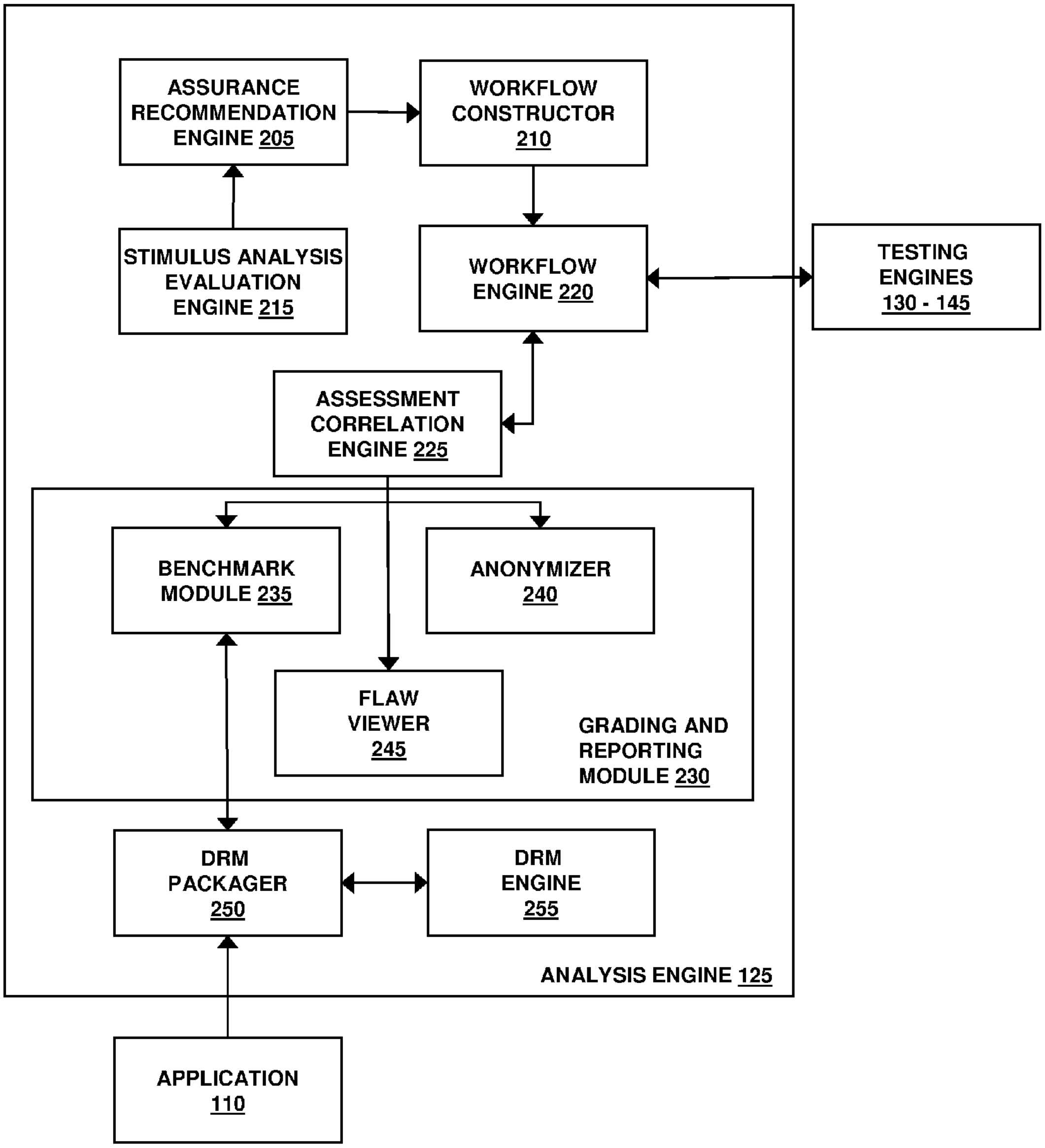
FIG. 2 is a more detailed diagram of a software analysis engine according to an embodiment of the invention.

FIG. 2 illustrates, in greater detail, the analysis engine 125 and its various components. In one embodiment, the analysis engine 125 includes an assurance recommendation engine 205, a workflow constructor 210, a stimulus analysis evaluation engine 215 and a workflow engine 220. Each of these components (described in greater detail below) interacts with the various testing engines 130-145 and executes various processes in accordance with an application-specific testing workflow, which is defined by an assessment correlation engine 225. Results from the analysis and testing are provided to a grading and reporting engine 230, which includes a benchmark engine 235, an anonymizer 240 and a flaw viewer 245. In some embodiments, such as those where the analysis and testing services are provided remotely and/or via a web-based subscription service requiring transmission of application components and results over public networks (i.e., the Internet), a digital rights management packager 250 and engine 255 may be used to encrypt the application and analysis results.

More specifically, the assurance recommendation engine 205 receives applications and application metadata and automatically determines various characteristics of the application. For example, the recommendation engine 205 may recognize the programming language used to write the application 110, specific libraries used within the application, the development environment used to build the application, application programming interfaces (APIs) available to users, the size of the application, as well as other technical qualities. Moreover, the entity responsible for submitting the application (which may be the owner of the application, a licensee, or an end user) may provide additional business context information such as the required availability (e.g., 99.99% uptime), expected throughputs or transaction volumes, types of users who will operate the application, whether the application will be exposed to the public, the operating system in which the application executes, other applications with which the application interacts, and others.

The metadata is supplied by the entity operating the platform, the owner of the application, or, in some cases, may be provided by a third party. In such cases, the metadata may include information related to the specific application, a group of applications (e.g., all banking applications within a retail bank), an enterprise-wide collection of applications, or, in some cases, industry-wide data.

The recommendation engine 205 considers these technical and business characteristics and application metadata and determines a recommended assurance level. As described in more detail below, the assurance levels are used by the workflow constructor 210 to define an assessment workflow based on various testing techniques such as dynamic application testing, static binary testing, automated and manual pen testing, as well as manual code review.

Once a workflow has been established by the workflow constructor 210, a workflow engine 220 submits the application to the various testing engines. The results of these tests may include such items as error rates, specific occurrences of errors, compliance with industry standards, as well as other data. The assessment correlation engine 225 correlates the different test results received from the testing engines 130-145 and organizes them by application module and type of error, identifies duplicates, and recognizes correlations among different errors.

The analysis engine also may include a grading and reporting module 230 that includes a benchmark module 235, an anonymizer 240 and a flaw viewer 245. The benchmark module 235 compares the testing and analysis results for one or more applications having similar application profiles and/or metadata. This allows the application's owner to see how the application's architecture and security features measures up against other similar applications.

In some instances, the benchmark engine 235 calculates and compares test results at a more granular level. For example, an organization may wish to determine which of its developers (or development teams) produces the best code, the most secure applications, or is most prone to development errors. By including information such as the code author, development group, and/or other organizational information, the platform may be used within a company to identify core strengths and/or key weaknesses.

The anonymizer 240 removes company-specific information from the results and/or aggregates the results such that they may be provided to subscribers or the public in general. In this manner, the platform 105 provides global view of software development and implementation trends related to security and vulnerability testing across a wide spectrum of industries and technologies.

As an example, a bank may be developing a new customer service application that allows its clients to execute transactions via the Web. Based on the technology used to develop the application (e.g., Active Server Pages, java, PHP), the fact that the application is available to the general public, and the information transmitted is highly sensitive (account numbers, PINs, etc.), the assurance recommendation engine 205 may determine that this application be tested as fully as possible. Each testing engine will then process the application (either remotely or as received at the platform 105) and the results are correlated into a comprehensive assessment report. Once completed, project managers at the bank may log into the platform using secure IDs and passwords, biometric authentication, PKI techniques or other such methods and, using the flaw viewer 245, review and comment on any vulnerabilities identified during testing. On some cases, the project managers may also see how the application fared against similar applications submitted by other banks.

In some embodiments, the vulnerability and quality scans are performed during the development of an application, and as such the results may be shared with the development team in real-time. This allows programmers and project managers to be apprised of potential flaws in their code prior to system testing or deployment, greatly reducing the time and cost to implement large-scale systems. In some cases, ongoing trends derived from industry-wide statistics (e.g., a bank's peer group is shifting to a newer, more secure java framework, or has migrated from MySQL to Oracle) are provided to help guide developers' efforts. In other instances, the prevalence of certain code across an enterprise or industry (e.g., commonly-used open source components, for example) is tracked over time and periodic updates may be sent to developers know to be using the code if newly discovered issues (technical, legal or both) are identified.

Regardless of the implementation, the method of implementing and distributing the various components of the platform is arbitrary. For example, in some implementations all components of the platform may be completely contained within an organization (e.g., within a firewall, accessible via a VPN or intranet) and available as an "on-demand" service as part of an overall development methodology. In other embodiments, the platform may be implemented as a web-based service available to numerous organizations that "subscribe" to the platform and are therefore able to subject their software applications to structured security assessment testing on an as-needed basis. Furthermore, various "anonymizing" or aggregation techniques can be used to remove or otherwise protect proprietary information and/or data that would identify the application owner. Assessment results from numerous applications across industries, technical platforms, application sizes, etc. can be extracted to provide cross-entity benchmarking data to platform subscribers. In addition, analysis of the assessment results and subsequent monitoring of the applications (for undetected security flaws or unexpected operational reactions to certain threats, for example) allow the platform 105, and specifically the workflow engine 220, to be refined and improved. By operating the platform 105 as a centralized yet secure resource for multiple entities, assessment data can be used for historical and industry benchmarking, as well as to upgrade the techniques used to determine assurance levels and built appropriate workflows.

In such cases, the need to securely transmit application code (both binary and source) to and from the platform 105 is crucial. One method for implementing the needed security measures is via digital rights management (DRM). In general, DRM refers to various access control technologies used by publishers and copyright holders to limit access to and/or usage of digital media or devices. Just as DRM is used to protect conventional copyrighted material (e.g., audio and video content), it may also be employed to protect source and binary code of an application as well the analysis and testing results generated by the platform 105. More specifically, a DRM packager 250 may be used to encrypt some or all of the application information and produce a key to decrypt the information. A DRM engine 255 executes the encryption and decryption functions that allow users to securely view application data via a remote device. Further operational and functional characteristics of DRM modules 250, 255 are set forth below.

Figure 2A:
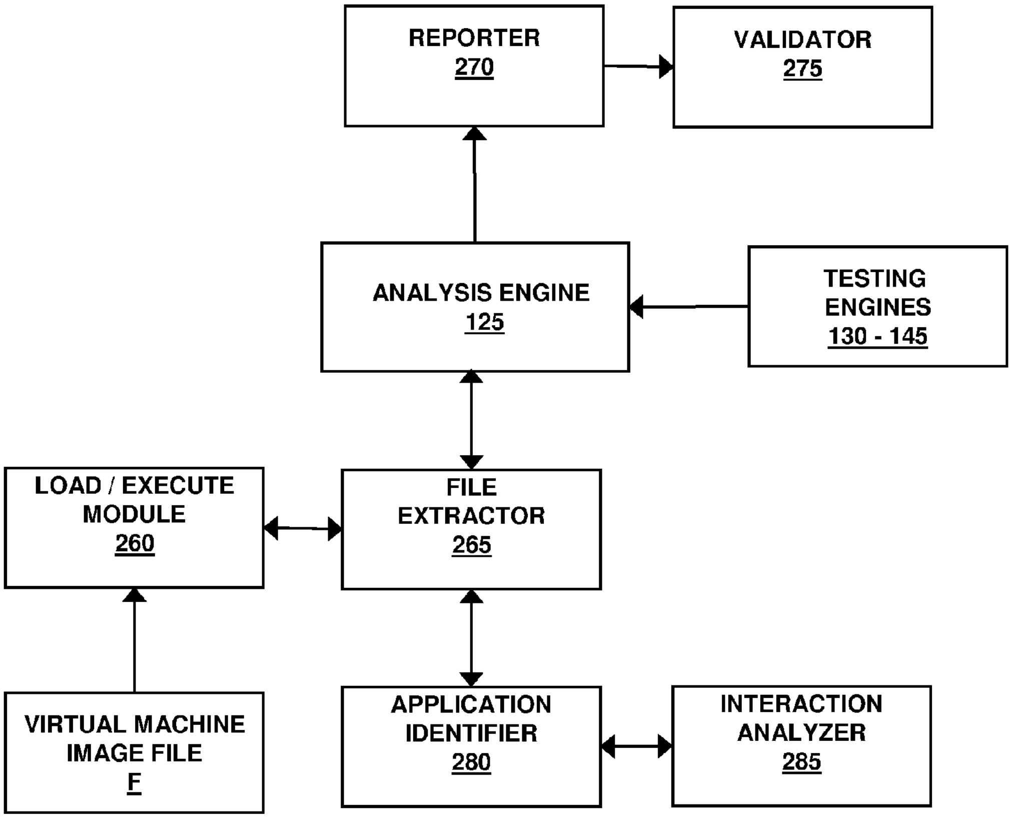
FIG. 2A is a block diagram of a software assessment and testing platform for validating and assessing the security and quality of a virtual machine image file according to one embodiment of the invention.

Referring to FIG. 2A, implementations used to analyze and report on a virtual machine image file F may include additional functional modules. For example, the file F is provided to a load and execute module 260, which loads and executes the virtual machine represented by the image file. A file extractor 265 extracts files from the image file for subsequent analysis, testing and execution, either as stand alone files or as part of an executing application. The analysis engine 125 then analyzes the extracted files for potential vulnerabilities. This may include the use of a profiler and/or scanner to detect the vulnerabilities within data flows among the identified files and applications as they execute within the virtual machine. A reporter 270 combines the detected vulnerabilities into a security report comprising a listing of potential vulnerabilities, and in some instances produces a security score based on the listing. A validator 275 compares the security report with a validation policy and associates the resulting security data with the image file.

In some implementations, an application identifier 280 and interaction analyzer 285 may be used to further identify installed applications within the virtual machine image file F and identify the information flow among the applications. Test data may also be provided (using, for example, a testing module) to the virtual machine to detect potential vulnerabilities and other security flaws.

Assessment and Recommendation

Figure 3:
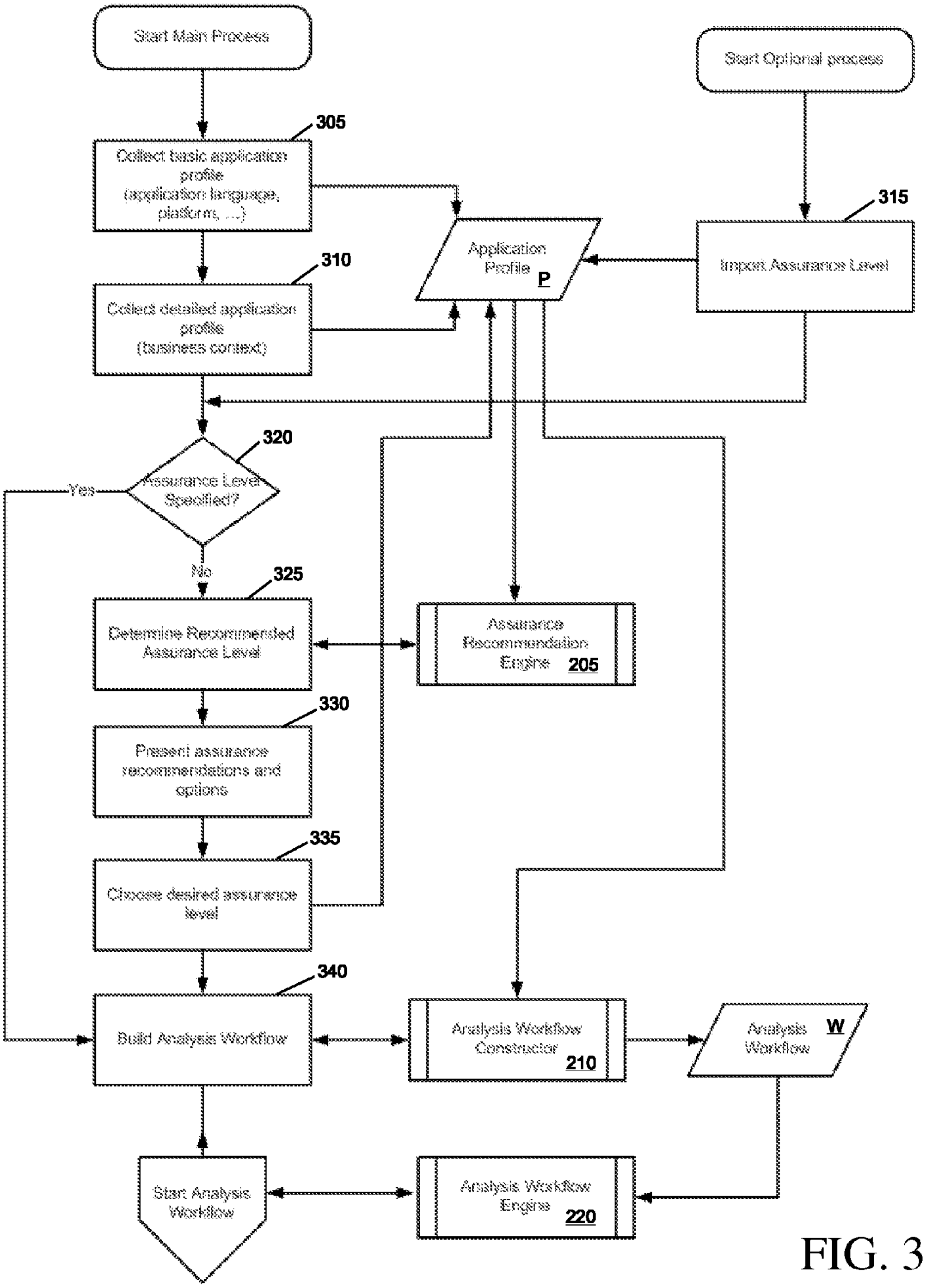
FIG. 3 is a flow chart depicting steps performed in developing a software analysis and testing workflow according to an embodiment of the invention.

Referring now to FIG. 3, one embodiment of the assessment and recommendation techniques of the invention includes three phases—a data-collection phase, an assurance-level determination phase, and a workflow-build phase. More specifically, the data-collection phase includes collecting technical details (STEP 305) about the virtual machine image file and the applications operating within the machine, such as the platform on which it will be built and/or implemented, the network topology over which it will operate, the language or languages used to develop the application, third-party applications or modules the virtual machine will interact with or use, the security environment in which the virtual machine will operate, as well as other characteristics. In addition, the business context in which the virtual machine will operate is determined (STEP 310), and combined with the technical details to produce an virtual machine profile P. In one non-limiting example, some or all of the business factors identified in the Federal Information Processing Standard (FIPS) (i.e., damage to reputation, financial loss or business liability, harm to business interests, unauthorized release of sensitive information, personal safety, civil liability and potential criminal violations) can be used as guidelines for measuring the security risks in light of the business context of the virtual machine. Each of the FIPS factors can be assigned a rating (e.g., as n/a, minimal, moderate or serious), and in some embodiments certain factors are weighted more than others according to relative importance, (e.g., as defined by a user or industry standards). For example, a virtual machine that includes an application that processes healthcare data including personally identifiable information may accord a rating of "serious" to factors such as damage to reputation, liability, unauthorized release of sensitive information and criminal liability, but "n/a" for personal safety. In instances in which this analysis has previously been done and an assurance level already determined, that assurance level can be imported (STEP 315), and in some circumstances updated if necessary.

If an assurance level was provided with the virtual machine or for the applications operating within the virtual machine as part of the data collection phase (DECISION STEP 320), the analysis workflow can be built. Otherwise, the assurance recommendation engine reviews the virtual machine profile P and determines an appropriate assurance level (STEP 325). One approach for determining an appropriate assessment level is to consider the ratings assigned to each of the business context factors, and select an appropriate assurance level based on the highest rating. For example, if any of damage to reputation, financial loss, harm to business interests, release of sensitive information or civil or criminal violations are rated "serious," the highest assessment level is recommended. If, however, all factors are either minimal or n/a except for, e.g., the "civil violations" factor (which is assigned a "moderate" rating), a lower but still relatively high assurance level is specified. Table 1 below summarizes one possible mapping of business impact factors and their ratings to recommended assessment levels.

TABLE 1

| Assurance Level Profiles<br>Assurance Level Impact Profiles | | | | |
|---|---|---|---|---|
| Potential Business Impact Categories for Application Flaws | AL2 | AL3 | AL4 | AL5 |
| 1. Inconvenience, distress or damage to standing or reputation | Min | Mod | Mod | Serious |
| 2. Financial loss or business liability | Min | Mod | Mod | Serious |
| 3. Harm to business interests | N/A | Min | Mod | Serious |
| 4. Unauthorized release of sensitive information | N/A | Min | Mod | Serious |
| 5. Personal Safety | N/A | N/A | Min | Mod |
| 6. Civil or criminal violations | N/A | Min | Mod | Serious |

The recommended assurance level (and in some cases options to modify the level) can then be presented to the user (STEP 330), who selects the assurance level (STEP 335) for the particular virtual machine implementation or, alternatively for the individual applications within the virtual machine.

In the workflow build phase, varying combinations of analysis techniques can be used to adapt a security review workflow to the particular technical and business criteria of an application, with one key goal being the reduction of false negatives, i.e., undetected security flaws. Different types of analysis (e.g., automated, manual, static, dynamic, etc.) have different false negative rates because they are either unable to detect particular security defects (100% false negative rate) or they have varying levels of false negatives depending on the threat. As a result, introducing additional security analysis processes into the workflow lowers the false negative rate. But multiple analysis techniques require the expenditure of more time and resources, and so should be integrated into the workflow when they contribute meaningfully to the overall reliability of the analysis or to lower the false negative rate below a predetermined threshold.

In one implementation, the workflow W is constructed (STEP 340) by selecting different analysis techniques from the following table. The higher the desired assurance level, the more analysis techniques are recommended. The analysis techniques are arranged according to the time and resources estimated to perform the analysis, thereby minimizing costs and only introducing more stringent analyses when the impact of a security event is greater. Once the workflow is determined and approved by the user, the various analysis techniques are performed. Table 2 below illustrates how various analysis techniques may be used against applications with different assurance levels.

TABLE 2

| Analysis/Assurance Level Mapping | | | | | |
|---|---|---|---|---|---|
| Analysis | Assurance Levels | | | | |
| Techniques | AL1 | AL2 | AL3 | AL4 | AL5 |
| Automated Static Analysis | None Required | • | • | • | • |
| Automated Dynamic Analysis | | | • | • | • |
| Manual Dynamic Analysis | | | | • | • |
| Manual Code Review | | | | | • |

Chaining and Correlation of Analysis Results

Combining multiple types of application analysis generally produces a broader application vulnerability profile. For example, combining binary static analysis and dynamic analysis techniques provides increased accuracy and more informative analysis results because the outcome of a binary static analysis can be used as input into a secondary dynamic analysis. The dynamic analysis process itself produces two results: a dynamic assessment and a static coverage map. The static coverage map contains each dynamic path used to reach a flaw detected during the static analysis.

Figure 4:
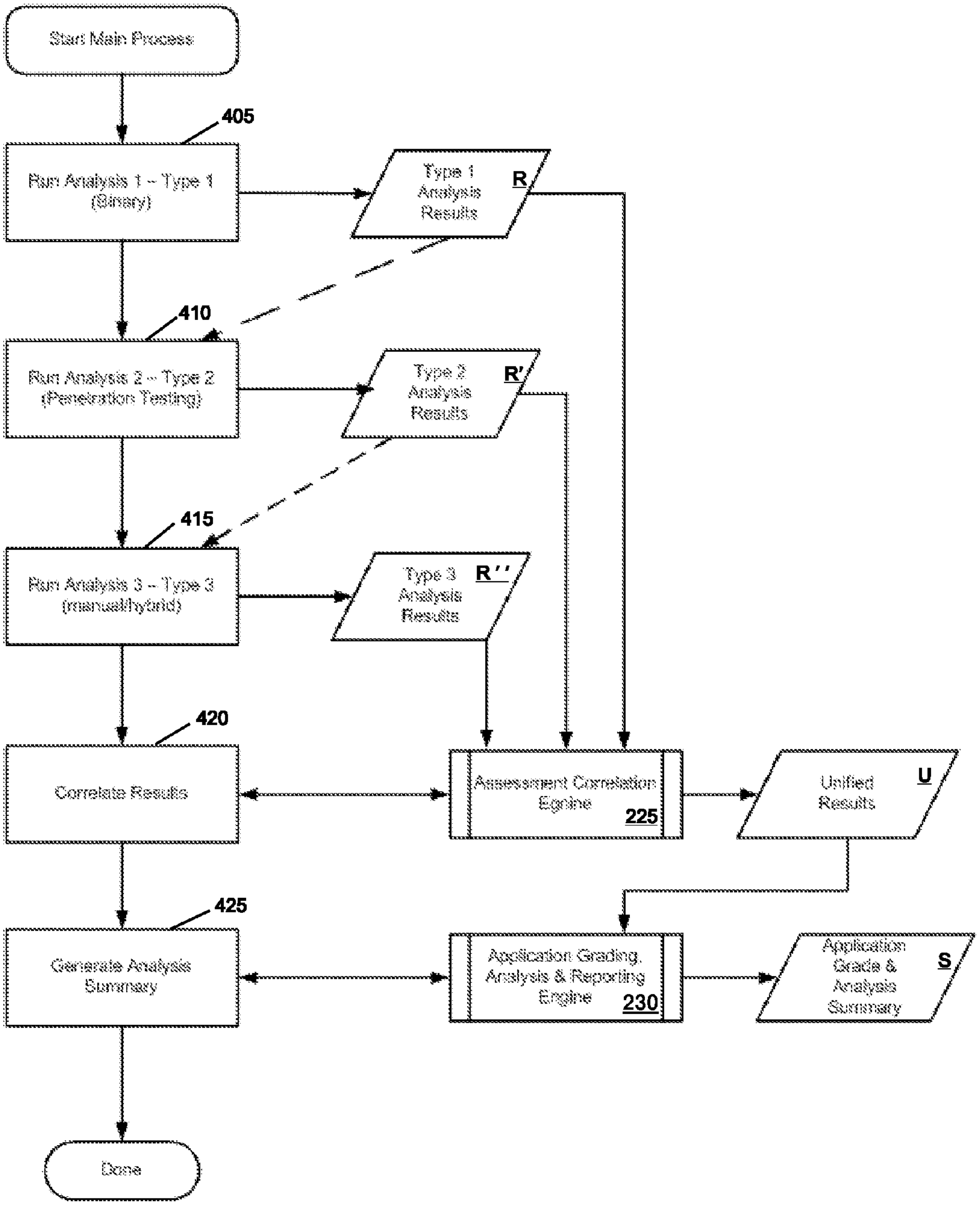
FIG. 4 is a flow chart depicting steps performed in developing a software analysis and test report according to an embodiment of the invention.

The static results, dynamic results, and static coverage map are used to produce a report of static flaws not pathed (lowest priority), static flaws with a dynamic path (high priority), and dynamic flaws not related to the portions of the application that have been statically analyzed (e.g., environment/configuration). The data flow and control flow graphs generated by static analysis may also be used to compute a dynamic test case for each identified flaw. In such cases, input data and an input vector may be generated that will recreate and retest each flaw dynamically to determine if the flaws have been addressed. More specifically, and with reference to FIG. 4, the following steps can be performed to combine results from both the static and dynamic testing:

STEP 410: Instrument the binary within a runtime test environment in preparation for the dynamic test. A correlation agent is executed on the same computer as the binary will execute. The correlation agent loads the binary and sets debug breakpoints or shims at each binary offset at which potential defect was detected during the binary static analysis. The results R' may be stored and/or used as input into the dynamic analysis.

STEP 415: Run the dynamic analysis. The dynamic analysis uses general test cases to find new flaws and specific test cases to retest flaws identified during the static analysis. During the analysis, the dynamic tester listens for call backs from the correlation agent running on the computer under test. If it receives a call back it records the time and information sent by the agent. During the dynamic test, if a debug breakpoint or shim is hit, the correlation agent sends a callback to the dynamic tester with information about the breakpoint or shim offset within the executable.

STEP 420: Determine, using a correlation process, which dynamic test inputs correlate to which potential defects found during binary static analysis by using the callback information.

STEP 425: Create a summary S from the correlated results U. If defects were found by both static and dynamic analysis then those defects are reported as high confidence.

Continuous Application Assurance

In some embodiments, continuous application assurance provides for automatic re-analysis of a virtual machine image file and the applications operating within the virtual machine. Re-analysis is triggered by changes in the external environment (e.g., threat space, business intelligence, detected attacks) and/or the implementation of enhanced analysis capabilities (e.g., a new scan has been added to an analysis workflow to detect new class of vulnerability). An intelligent re-analysis decision can be made by taking into account factors such as application profile, previous vulnerability assessment results, and the type of change (e.g., threat and/or scan capability).

A decision to initiate a re-analysis can be based, for example, on a technological profile, metadata describing the functionality of a virtual machine and/or the applications operating within the machine, the deployment environment of the virtual machine, new information about vulnerabilities that may affect the virtual machine, and/or increases in a likelihood of a threat. External data feeds and internal scan capabilities database may be used to trigger rescans of the virtual machine or specific applications within the machine. For example, suppose a new vulnerability is discovered in how data is transmitted and processed using XML and Web Services that did not exist when a particular application within a virtual machine was first scanned. All virtual machines that include applications having metadata that includes both XML and Web Services are identified, and the relevant analysis workflows are updated with the new scan information and re-processed.

Figure 5:
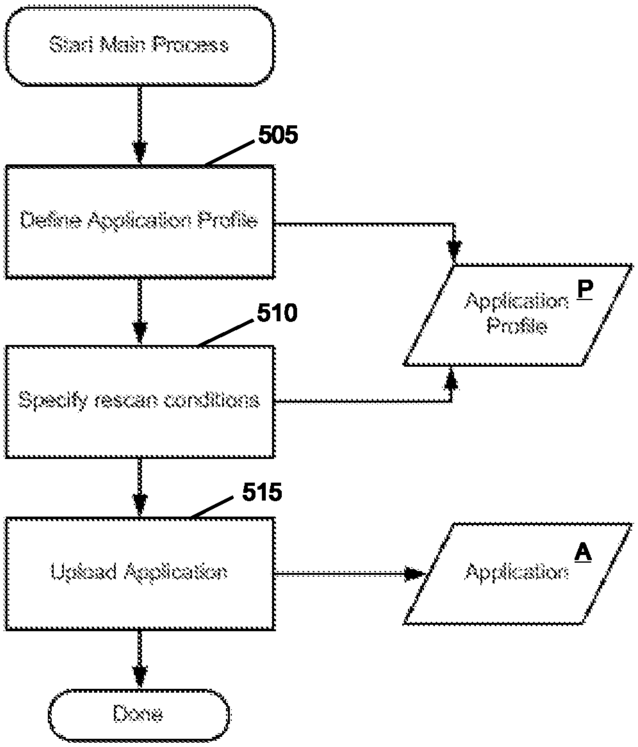
FIG. 5 is a flow chart depicting steps performed in defining and loading a software application for analysis and testing according to an embodiment of the invention.

In one embodiment, with reference to FIG. 5, the initial steps for an application-specific or customer-driven rescan include:

STEP 505: Define an application profile P for a web-based application, e.g., a J2EE-based retail brokerage application for a Fortune 100 financial services company, deployed with an Apache web front-end and backed by an Apache Tomcat application server and an Oracle database. In addition to the web interface aimed at consumers, the application has a Web Services API for exchanging data and enabling partners to conduct transactions.

STEP 510: Define rescan conditions based on the application's attack profile. In this example, any new attack vectors against Java applications or XML (for the Web Services interface) as well as attacks specifically targeting infrastructure components—Apache, Tomcat, and Oracle would constitute a rescan condition.

STEP 515: Upload the application A to the platform and perform the initial binary analysis to model the application's data flows and control flows.

In some implementations, the rescanning process may be implemented as a required step for submitting a virtual machine, code or applications to a third-party application platform. For example, an entity that provides a suite of community-developed applications for its communications and entertainment devices (e.g., the AppStore by Apple) may, as a condition for offering an application, require the application be scanned prior to being made available to the public. The scan may be done prior to an initial upload, as well as on a periodic basis. In some instances, the scan may not be required, but a recognizable label (e.g., an icon, or image) is shown alongside the application to indicate that it has been scanned for potential vulnerabilities. In other cases, a user may be offered the application for free, but, if they want the additional assurance of having the application scanned, may pay a nominal fee (e.g., $2.99).

Figure 6:
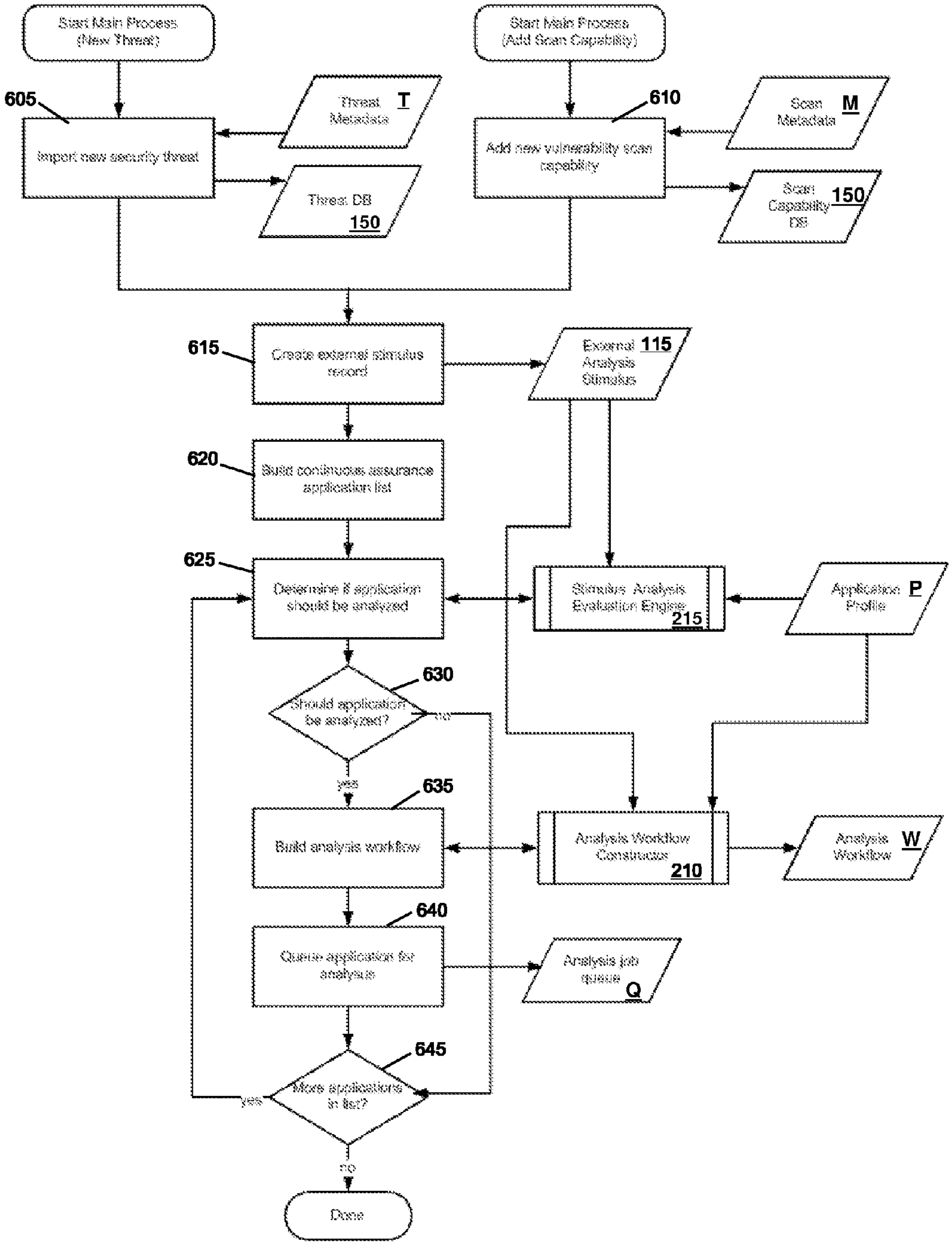
FIG. 6 is a flow chart depicting steps performed in performing periodic software application analysis and testing according to an embodiment of the invention.

In addition to single application rescans as described above, a platform-wide rescan may also be initiated in which multiple applications (possibly owned and/or operated by unrelated entities) are rescanned. In addition, application owners may "subscribe" to a periodic and/or event driven rescan service that continuously determines if rescans are necessary and if so, performs the appropriate analysis. More specifically, and referring to FIG. 6, one method for implementing a global rescan includes the following steps:

STEP 605: A new method for attacking XML interfaces is discovered and threat metadata M and general remediation information T are imported into the threat database.

STEP 610: When a new attack vector is discovered, security researchers and developers create a new scan that detects instances of the vector. The new scan capability is classified, codified, and is added to the threat database 150.

STEP 615: Generate and store a re-scan change event in the database.

STEP 620: Determine which applications are identified for continuous application assurance, and perform the following steps for each such application.

STEP 625: The stimulus analysis evaluation engine 215 uses the application profile P and the external analysis stimulus 115 to determine whether or not the application needs to be re-analyzed. For example, in the case of the XML interface threat noted above, web applications that expose an XML-based Web Services API are rescanned.

DECISION STEP 630: If the application is to be rescanned, move to Step 635, otherwise check to determine if additional applications are queued for rescan.

STEP 635: Build the analysis workflow W by comparing the external stimulus to the application profile. In some cases, it may not be necessary to re-run all of the existing scans, and instead only run the new scans that apply to the particular application.

STEP 640: Insert the application into the job queue Q along with its custom analysis workflow W.

STEP 645: Repeat the process for each application configured for continuous application assurance. For each application, either it is deemed not in need of a re-scan, or it is added to the job queue along with the corresponding workflow.

Remote Application Analysis

In some embodiments in which a static binary analysis is performed remotely (e.g., within the security assessment platform separate from the operational environment in which the virtual machine is implemented or where its source code is stored), the results of the binary analysis can be linked to the original virtual machine image file. These results are typically stored and managed securely on within the platform 105, but can be viewed by a remote user together with local virtual machine image fileusing a viewer application.

Figure 7:
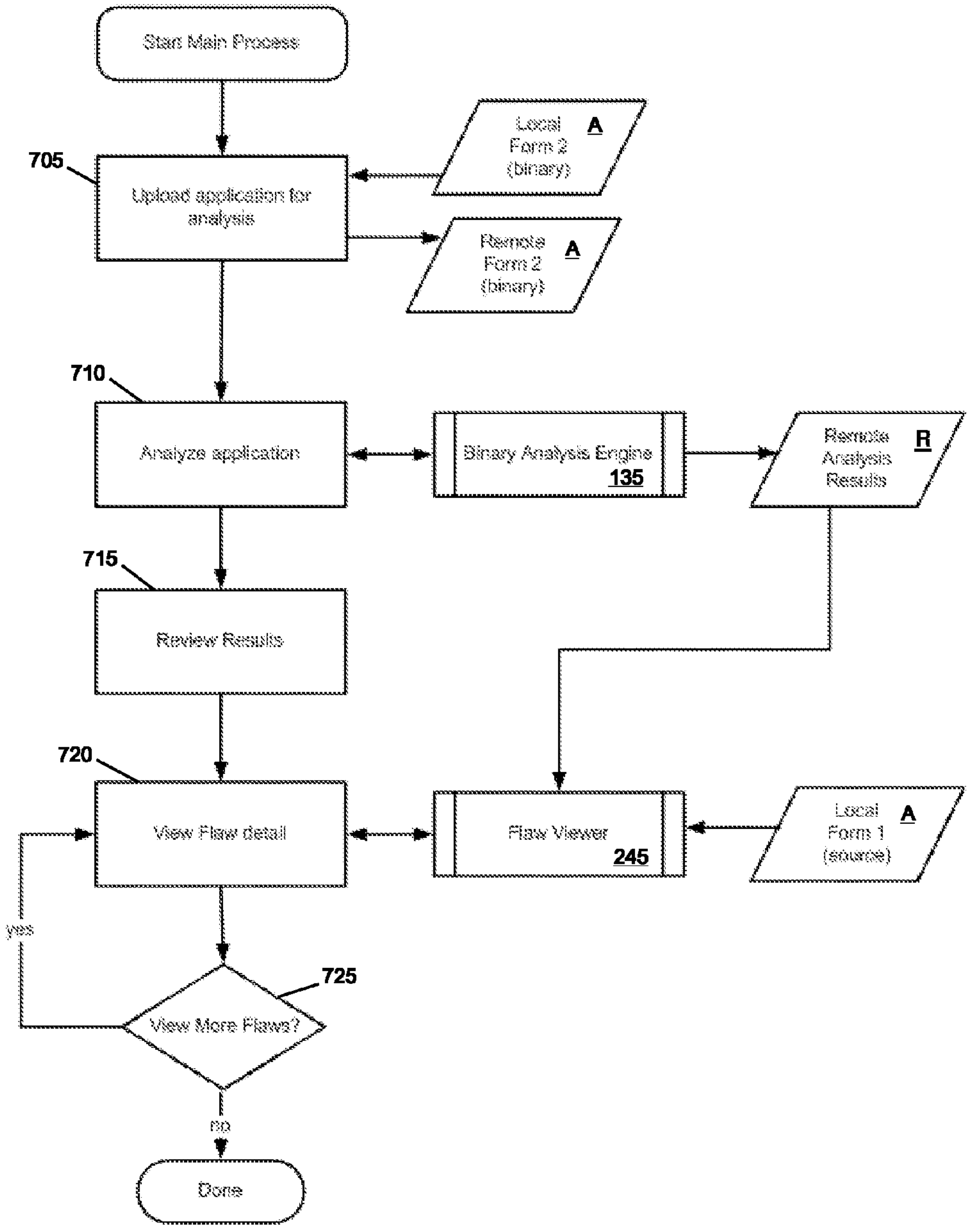
FIG. 7 is a flow chart depicting steps performed in identifying and presenting flaws in software applications.

Referring to FIG. 7, one method for providing simultaneous viewing of identified virtual machine flaws along with the application source code that caused the flaws can include the following steps:

STEP 705: Upload virtual machine metadata and virtual machine image fileA from a local system to the assessment platform for analysis.

STEP 710: Initiate static binary analysis for the virtual machine and store the results at the central location. As part of the analysis, flaws identified in the analysis results R include references to application source code file and line number obtained using debug symbol information during the analysis.

STEP 715: A user or owner logs into the platform using a remote application and views the list of flaws stored in the platform.

STEP 720: The user selects one or more individual flaws to view, and in response a viewer program 245 in the remote application locates and opens the associated local source code file A and navigates to the relevant line number.

STEP 725: The process iterates though all flaws or, in some cases, only those flaws identified as critical by the user.

Peer Benchmarking

In some embodiments, the platform 105 provides a common repository for metadata as well as assessment results for numerous virtual machines and applications across a variety of technical and business implementations and/or of known quality. By maintaining such a database, the platform can provide cross-application reporting that compares a particular application (or group of applications implemented within a virtual machine) to others in the same industry, to applications that use the same technology, and/or based on other criteria rendering one class of application relevant to another. In some instances, assessment results may be compared to those generated by a template application to determine the quality of the application as compared to an application of known quality. Such reporting (referred to as "peer benchmarking") allows an organization to gauge the effectiveness of its own security initiatives relative to other companies in the same industry. Because the assessment platform provides consistent and repeatable security-analysis techniques, a common assessment vocabulary and a large sample size, the information provided to users has a greater global relevance than individual application assessment data.

Figure 8:
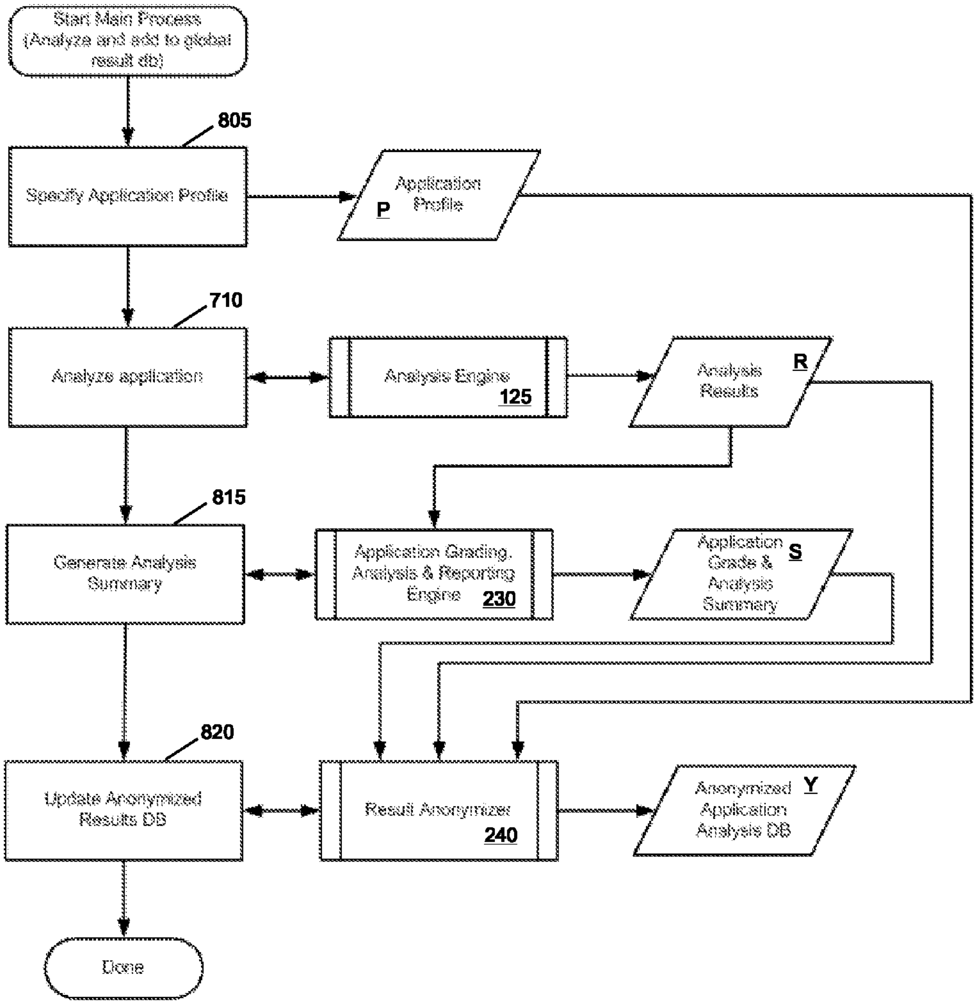
FIG. 8 is a flow chart depicting steps performed in accumulating results from multiple software application analyses and tests according to an embodiment of the invention.

Referring to FIG. 8, one method for providing peer benchmarking reporting to users of the platform includes the following steps:

STEP 805: The virtual machine profile P is specified based on the operating system, type of applications, and the business context. One example is a customer-facing financial services web application written in Java operating on a Linux OS.

STEP 710: The virtual machine is analyzed using a consistent, repeatable process as described above.

STEP 815: A standardized analysis summary S is generated by the reporting engine 230 that contains an overall security score and other security metrics.

STEP 820: The analysis summary is anonymized so that the summary cannot be traced back to the original application, operating system components, data, the organization that created the application, or the organization that submitted the application for analysis. The anonymous summary Y may be loaded into the assessment results database.

Figure 9:
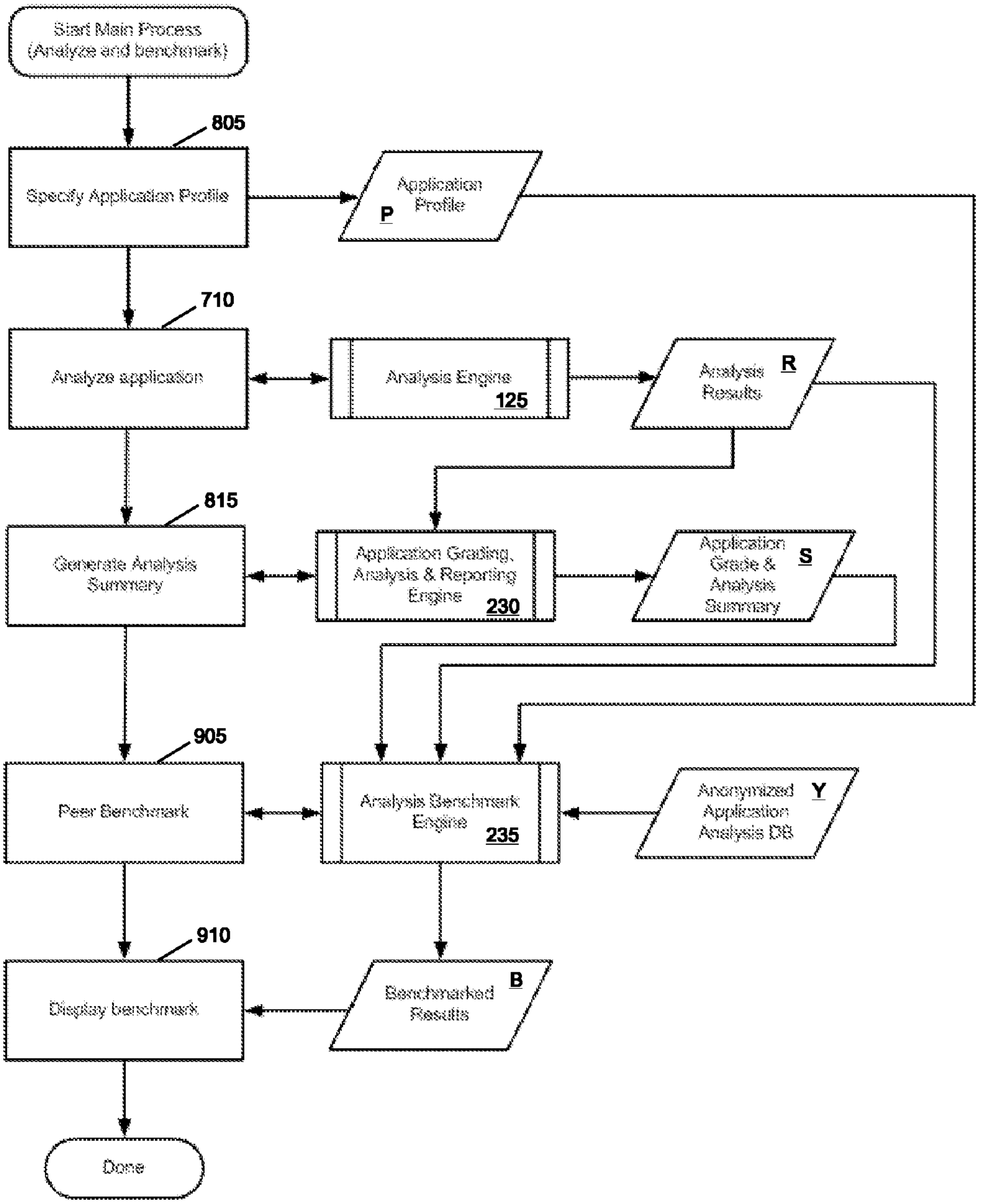
FIG. 9 is a flow chart depicting steps performed in providing software analysis and testing benchmarks according to an embodiment of the invention.

Once the results database 155 is populated with assessment results from a sufficient number of virtual machines and applications, users can specify and view various reports. Some reports, for example, can indicate how, statistically, a particular image file or application compares to its "peers" by indicating the percentage of all assessed images or applications (or some subset thereof) that resulted in fewer potential vulnerabilities. In one example, with reference to FIG. 9, the benchmark reporting process can include the following steps:

STEP 805: The virtual machine profile P is specified based, for example, on the operating system, the types of applications included in the image, and/or the business context.

STEP 710: The virtual machine is analyzed using a consistent, repeatable process of determining, building and executing appropriate tests as described above.

STEP 815: A standardized analysis summary S is generated by the reporting engine 230 that contains an overall security score and other security metrics.

STEP 905: The assessment results database 155 is queried using the specified application profile(s). In some embodiments, a first query can be executed looking for exact or very close matches to the profiles. For example, if the application profile is "customer-facing financial services web application written in java operating on Linux" and the database contains a sufficient number of assessment for a meaningful peer benchmark to be compiled, (e.g., n>5), the application results R are compared to the anonymous results Y by, for example, placing the subject application in a designated quartile or decile. If the number of results is insufficient, the query parameters may be expanded to include results from implementations that have similar (but not necessarily exact) profiles until a desired result set is obtained.

STEP 910: The peer benchmark data B may be displayed in tabular and/or graphical format (e.g., a histogram) showing, for example, the count of similar implementations that scored in each quartile. Profiles of the anonymous implementations can also be shown along with the summary report.

Secure Delivery of Assessment Data

The vulnerability assessment process consumes and produces data that is considered highly confidential by most organizations. For example, input into the analysis phase can include the virtual machine image file, application source code, application binaries and debug symbols, and/or environment data (URLs, usernames/passwords, site maps). Because of the sensitive nature of this data, and because they indicate potentially exploitable security flaws, provision is desirably made to keep the analysis results confidential. In instances in which the platform is operated as a centralized, offsite service, the need to secure this sensitive information becomes even more crucial. In various embodiments, the DRM packager 250 and engine 255 provide the following capabilities:

A secure "container" file that contains the assessment data in a structured and encrypted form that can only be produced and consumed by the DRM technology employed by the platform 105.

An API or application that transforms structured data into a secure container and specifies the access control rules for the contents of the secure container.

Secure container content access to a known/trusted application when the access control rules are satisfied (typically specified by the presence of a DRM license bound to the user and client hardware).

An access token that provides access granting data (e.g., time, machine hardware id, username, IP address, license id, etc.) to allow access to structured data within the secure containers.

Using the DRM engine 255, steps may be taken to protect the initial data provided as input to the assessment process as well as the analysis results. Once the submission data has been packaged into a secure container, access is granted to the trusted analysis application for the duration of the analysis. Analysis results can then be packaged into a secure container for remote viewing. A trusted secure viewer application (in conjunction with the DRM Client engine and access token) ensures that the analysis results are viewed by authorized users and prevents unauthorized copying via printer, cut/paste, print screen, or file copy.

Figure 10:
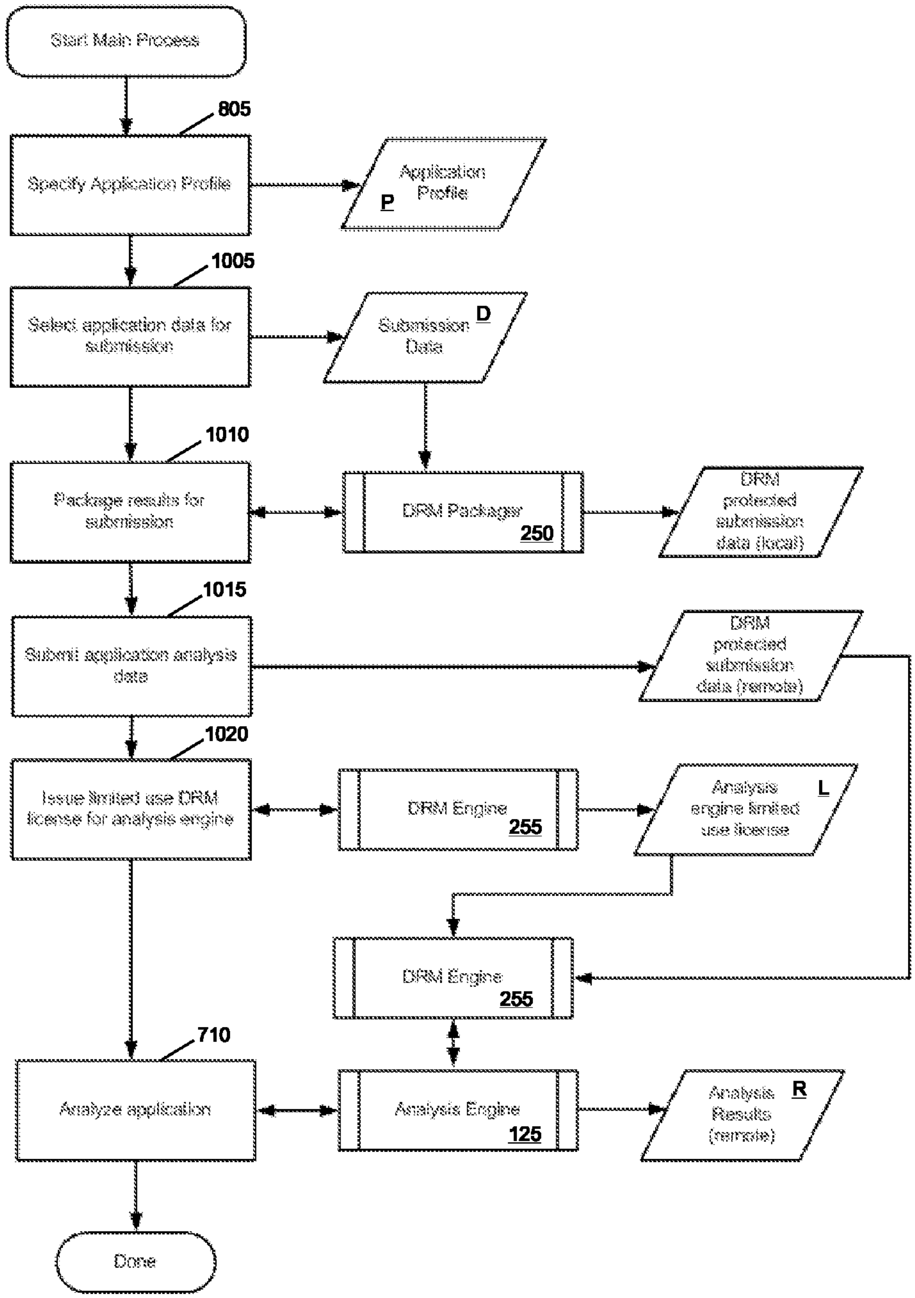
FIG. 10 is a flow chart depicting steps performed in securely submitting software applications for analysis and testing according to an embodiment of the invention.

Referring to FIG. 10, the following steps provide the secure receipt and analysis of application source files and assessment data to and within the platform:

STEP 805: Create a remote application profile P using the application metadata provided by the user and/or identified from the application itself.

STEP 1005: Identify the input data D to the application analysis, either manually by a user or automatically by the analysis engine (e.g., a list of binary files, a list of source code files, etc.)

STEP 1010: Place the submission data D in a secure container using the DRM packager 250.

STEP 1015: Submit the secure container to the platform for analysis as described above.

STEP 1050: Using the DRM engine 255, issue a limited-use DRM license to the analysis engine to allow access to the analysis input data.

STEP 710: The analysis engine 125 performs the prescribed analyses using the DRM engine 255 and issued license to access input data, and the output is stored in a secure database.

Figure 11:
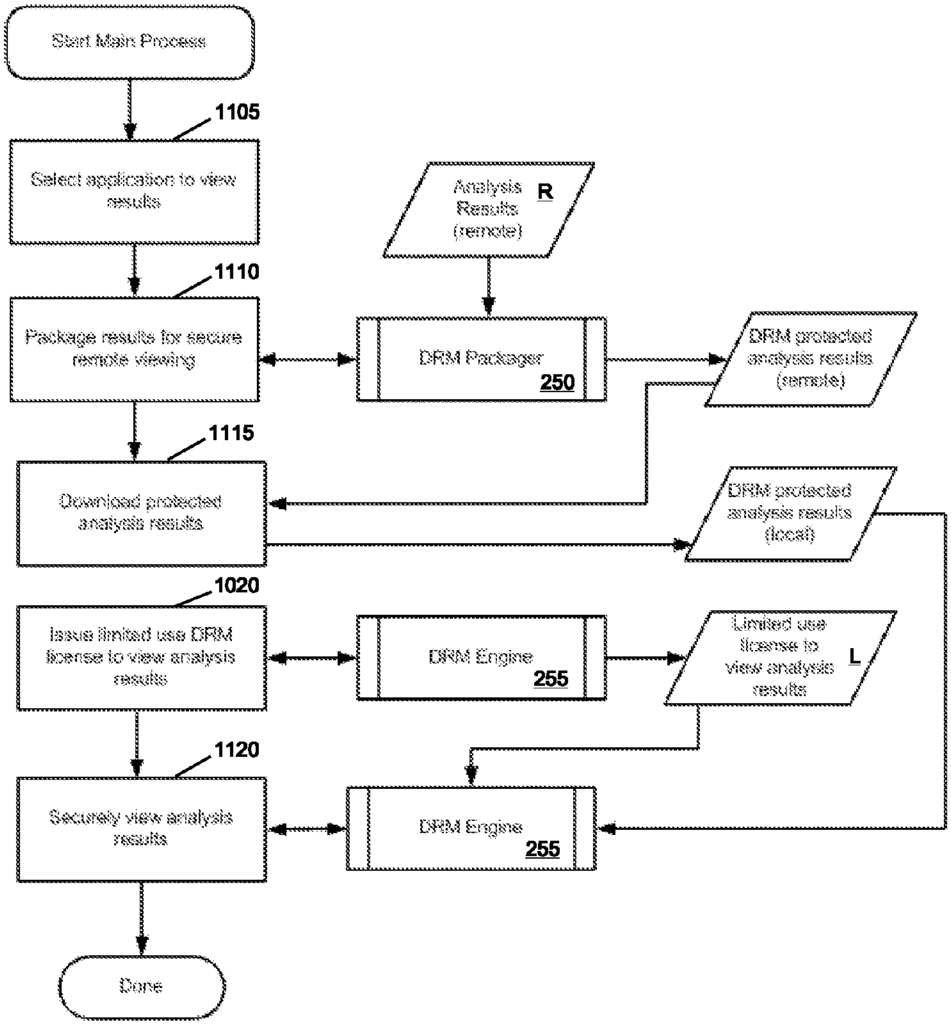
FIG. 11 is a flow chart depicting steps performed in securely viewing software application analysis and testing results according to an embodiment of the invention.

Referring to FIG. 11, once the analysis data is stored in the database, it can then be packaged and transmitted using similar DRM techniques and the following steps:

STEP 1105: A user selects an application for which he wishes to view the analysis results R from a remote site.

STEP 1110: The analysis results R are placed in a secure container using the DRM packager 250 for viewing.

STEP 1115: The secure container is downloaded to a local machine from the platform for viewing by the user.

STEP 1020: A limited-use license is granted to the local machine to allow viewing of analysis results contained in the secure container. The license limits use to the target machine, the user, or in some embodiments, a combination of the two.

STEP 1025: The secure viewer displays the analysis results from the secure container. The data is persistently protected and operations like cut/paste/screen dump are disabled.

In some implementations, security analysis and vulnerability testing results may be "packaged" or "bound to" the actual software it describes. In some cases, the software may be a commercially-available product delivered via traditional methods such as CD-ROM or download, whereas in other cases the software may be a website or collection of websites that provide the software and/or services over the Internet, commonly referred to as software as a service, or "SaaS". In still other cases, software may refer to a collective of otherwise unrelated applications and services available over the internet, each performing separate functions for one or more enterprises, (i.e., "cloud" computing). In yet other instances the software may be a complete operational environment implemented as a virtual machine that includes an instantiation of an operating system and multiple user applications. By linking the report to the software itself, downstream users of the software can access information about the software, make informed decisions about implementation of the software, and analyze the security risk across an entire system by accessing all (or most) of the reports associated with the executables running on the system and summarizing the risks identified in the reports.

Numerous techniques may be used for binding the report to and/or associating the report with the executable. In some implementations, for example, the binding can be "weak" in that the executable name and version number are listed in the report and referenced either manually or automatically. If the report information is accessed programmatically, an executable a query can be submitted to a database storing a collection of software security reports and the desired report retrieved. The database may be private (e.g., behind a firewall and accessible only to authorized users or employees) or public, and made available via the Internet to the general population for query and review.

In other instances, the report may be "loosely" bound to the software by computing a cryptographically secure hash of the software and including the hash in the body, metadata or header of the report. In such cases, users of the software are provided with a hash program that computes the required hash and submits the hash as a lookup key to a database of reports. In this instance, the reports remain somewhat "decoupled" from the software as there may be many report providers and the reports may be updated over time without needing to redistribute the software which is desirable given the ever-changing threat landscape.

In another implementation, a "strong" binding between the software and its vulnerability report uses a URL as a unique reference address of the report or, in some cases, the report is embedded alongside software binaries in environments that support application packages. While not as flexible as the weak or loose techniques described above, no lookup is needed and the report can "travel" with the software. For environments that support application packages (WAR, EAR, JAR, Mac OS X app packages) the report is a file alongside the manifest in the bundle.

The vulnerability reports can be expressed in an XML format so that automated processes can query the report based on predetermined tags and find the information needed to make security decisions regarding the executable. The report may be cryptographically signed by the report provider so that tampering with the report contents can be detected—particularly important when the report is embedded in the binary or included in an application package. An example of XML that may be used to generate a report (or a portion of a report) is provided in the table below:

```
  <?xml version="1.0" encoding="ISO-8859-1" ?>
- <detailedreport xmlns="http://www.veracode.com/schema/reports/export"
      report__format__version="1.1" app__name="Sample Application" version="1.0"
      platform="Java" generation__date="2009-09-17 18:30:34 UTC">
- <static-analysis>
- <modules>
  <module name="sample.war" compiler="JAVAC__6" os="Java J2SE 6"
      architecture="JVM" score="58" numflawssev1="0" numflawssev2="14"
      numflawssev3="258" numflawssev4="7" numflawssev5="0" />
      </modules>
      </static-analysis>
- <dynamic-analysis>
- <modules>
  <module name="dynamic__analysis" compiler="" os="" architecture="" score="98"
      numflawssev1="0" numflawssev2="2" numflawssev3="2" numflawssev4="0"
      numflawssev5="0" />
      </modules>
      </dynamic-analysis>
  <severity level="5" />
- <severity level="4">
- <category categoryid="19" categoryname="SQL Injection" pcirelated="true">
- <desc>
  <para text="SQL injection vulnerabilities occur when data enters an application
      from an untrusted source and is used to dynamically construct a SQL query. This
      allows an attacker to manipulate database queries in order to access, modify, or
```

-continued delete arbitrary data. Depending on the platform, database type, and
configuration, it may also be possible to execute administrative operations on
the database, access the filesystem, or execute arbitrary system commands.
SQL injection attacks can also be used to subvert authentication and
authorization schemes, which would enable an attacker to gain privileged
access to restricted portions of the application.” />
</desc>
- <recommendations>
- <para text=“Several techniques can be used to prevent SQL injection attacks. These
techniques complement each other and address security at different points in
the application. Using multiple techniques provides defense-in-depth and
minimizes the likelihood of a SQL injection vulnerability.”>
<bulletitem text=“Use parameterized prepared statements rather than dynamically
constructing SQL queries. This will prevent the database from interpreting the
contents of bind variables as part of the query and is the most effective defense
against SQL injection.” />
<bulletitem text=“Validate user-supplied input using positive filters (white lists) to
ensure that it conforms to the expected format, using centralized data
validation routines when possible.” />
<bulletitem text=“Normalize all user-supplied data before applying filters or regular
expressions, or submitting the data to a database. This means that all URL-
encoded (%xx), HTML-encoded (&#xx;), or other encoding schemes should be
reduced to the internal character representation expected by the application.
This prevents attackers from using alternate encoding schemes to bypass
filters.” />
<bulletitem text=“When using database abstraction libraries such as Hibernate, do
not assume that all methods exposed by the API will automatically prevent SQL
injection attacks. Most libraries contain methods that pass arbitrary queries to
the database in an unsafe manner.” />
</para>
</recommendations>
- <cwe cweid=“89” cwename=“Failure to Preserve SQL Query Structure (‘SQL
Injection’)” pcirelated=“true”>
- <description>
<text text=“This database query contains a SQL injection flaw. The function call
constructs a dynamic SQL query using a variable derived from user-supplied
input. An attacker could exploit this flaw to execute arbitrary SQL queries
against the database.” />
</description>
- <staticflaws>
- <flaw issueid=“83” module=“sample.war” severity=“4” type=“Failure to Preserve SQL
Query Structure (‘SQL Injection’)” description=“This database query contains a
SQL injection flaw. The call to java.sql.Statement.executeQuery( ) constructs a
dynamic SQL query using a variable derived from user-supplied input. An
attacker could exploit this flaw to execute arbitrary SQL queries against the
database. Avoid dynamically constructing SQL queries. Instead, use
parameterized prepared statements to prevent the database from interpreting
the contents of bind variables as part of the query. Always validate user-
supplied input to ensure that it conforms to the expected format, using
centralized data validation routines when possible. References: CWE
(http://cwe.mitre.org/data/definitions/89.html) OWASP
(http://www.owasp.org/index.php/SQL__injection)” note=“” cweid=“89”
remediationeffort=“3” exploitLevel=“0” sourcefile=“sample1.java” line=“213”
sourcefilepath=“org/sample/utils”>
- <mitigations>
<mitigation action=“Mitigated by Design” description=“The tainted data in this case
comes from locked down database system tables.” user=“Demo User”
date=“2009-09-04 14:12:34 UTC” />
<mitigation action=“Mitigation Accepted” description=“This makes sense.”
user=“Demo User” date=“2009-09-04 14:12:53 UTC” />
</mitigations>
- <exploitability__adjustments>
- <exploitability__adjustment score__adjustment=“−1”>
<note>The source of the tainted data in this web application flaw is not a web
request.</note>
</exploitability__adjustment>
</exploitability__adjustments>
</flaw>
- <flaw issueid=“151” module=“sample.war” severity=“4” type=“Failure to Preserve SQL
Query Structure (‘SQL Injection’)” description=“This database query contains a
SQL injection flaw. The call to java.sql.Statement.executeUpdate( ) constructs a
dynamic SQL query using a variable derived from user-supplied input. An
attacker could exploit this flaw to execute arbitrary SQL queries against the
database. Avoid dynamically constructing SQL queries. Instead, use
parameterized prepared statements to prevent the database from interpreting
the contents of bind variables as part of the query. Always validate user-
supplied input to ensure that it conforms to the expected format, using
centralized data validation routines when possible. References: CWE
(http://cwe.mitre.org/data/definitions/89.html) OWASP
(http://www.owasp.org/index.php/SQL__injection)” note=“” cweid=“89”

-continued remediationeffort=“3” exploitLevel=“0” sourcefile=“sample1.java” line=“220”
sourcefilepath=“org/sample/utils”>
- <exploitability_adjustments>
- <exploitability_adjustment score_adjustment=“−1”>
<note>The source of the tainted data in this web application flaw is not a web
request.</note>
</exploitability_adjustment>
</exploitability_adjustments>
</flaw>

One example of an automated process that references a bound vulnerability report may include a whitelisting agent operating as software. The software agent may execute on a server or client, including hand-held devices, smart phones, PDAs, and the like. Procedurally, the agent computes the hash value for the executable for which it is attempting to validate and sends the hash to its whitelist database. If the hash is in the whitelist, the executable is permitted to execute (or be installed, copied, transferred or otherwise used). Conventional whitelisting databases only consider software provenance when making a binary decision whether to allow the software to execute—if the provenance is known it runs, if not, the software is not executed. In contrast, the whitelist agent described herein takes advantage the software security report to make a more informed decision based on numerous data points. For example, an overall software quality rating or the number and type of known security defects may affect the decision whether to execute the software or not, or under what conditions the software may be executed.

For example, an organization may have a policy stating that a web application on the external network cannot have any cross-site scripting (XSS) vulnerabilities yet software running on the internal network may allow XSS vulnerabilities. The policies used by the whitelisting agents running externally can refer to the software security report for a count of XSS defects, and if the count is non-zero, restrict the execution of the software.

In other cases, the security report may be used to verify that proper change and release processes were followed for new versions of the software. In a controlled change and release process, decision gates may be used to control a release of the software into a production environment or for use as a gold disk for reproduction. With the report bound to an executable, an automated scanning application may investigate a production environment and verify the efficacy of the change and release process by ensuring that all deployed binaries have a recent report and a valid security rating.

In another example in which software is distributed through a central repository (e.g., SourceForge, iTunes App Store, BlackBerry AppWorld, Android Marketplace, etc.) bound security reports offer a higher assurance level to the consumer because the application has been rated for security and not tampered with prior to downloading. In some instances the reports may be made available through the same central repository. In certain instances, the software vendor may make one version of the application available for free or a reduced price, but another version that includes the security report (or access to it) available at a higher price, as some customers may appreciate the added value and security that access to the report and data provides.

The bound security report may also be used in conjunction with an application installation process for desktop or server applications. Where today operating systems such as Windows Vista alert the user if an unsigned application is to be installed, a future system might detect the presence of a ratings report and display it, or alert to the absence of a ratings report. Similarly, bound security reports may be used to strengthen browser security policies by providing more information about the applet to be run.

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method of identifying vulnerabilities of a collection of software programs compiled into a virtual machine image, the method comprising the steps of:

receiving an image file representing a computer system as a virtual machine, wherein the image file comprises at least one of operating system information, an application, an application server, application data, and configuration information;

loading the image file into a computer memory;

executing the loaded image file to implement the virtual machine on a processor; and analyzing the executing image file to obtain a listing of potential vulnerabilities, the analysis comprising:

extracting files of the virtual machine from the image file;

identifying at least one installed application within the virtual machine;

identifying and separating one or more files related to the installed application;

building a control flow model of at least one of the separated files;

building a data flow model of at least one of the separated files;

detecting one or more potential vulnerabilities of each separated file by scanning one or more of the models and using a vulnerability database; and combining the detected potential vulnerabilities with the listing of potential vulnerabilities.

2. The method of claim 1, wherein the analyzing step further comprises inspecting an operating system configuration to detect one or more potential vulnerabilities.

3. The method of claim 1, wherein the analyzing step further comprises inspecting registry files to detect one or more potential vulnerabilities.

4. The method of claim 1, wherein the analyzing step further comprises determining if a plurality of applications are included in the virtual machine, and if so, analyzing interactions among the plurality of installed applications comprising the steps of:

building an interaction control flow model among the plurality of installed applications;

building an interaction data flow model among the plurality of installed applications; and detecting one or more potential vulnerabilities by scanning each interaction model.

5. The method of claim 1, wherein the analyzing step comprises scanning the executing image file using one or more of a network vulnerability scanner and a host vulnerability scanner.

6. The method of claim 1, further comprising the steps of:
- detecting an executing application within the virtual machine;
- detecting potential vulnerabilities of the executing application using a scanner; and
- combining the detected potential vulnerabilities with the listing of potential vulnerabilities.

7. The method of claim 6, wherein the detecting the potential vulnerabilities of the executing application comprises:
- connecting to the executing application within the virtual machine;
- providing at least one test input to the executing application; and
- inspecting a response from the executing application to the at least one test input to detect one or more potential vulnerabilities.

8. The method of claim 7, further comprising providing login credentials of the executing application.

9. The method of claim 7, further comprising providing predetermined user interface navigation information associated with the executing application to the scanner for use in detecting the potential vulnerabilities of the executing application.

10. The method of claim 7, further comprising providing sample user input data associated with the executing application to the scanner for use in detecting the potential vulnerabilities of the executing application.

11. The method of claim 6, further comprising performing fuzz testing on the executing application comprising the steps of:
- sending test data to the executing application through a network port; and
- inspecting a response of the executing application to the test data to detect one or more potential vulnerabilities.

12. The method of claim 11, further comprising re-executing the loaded image file if the executing application does not respond to the test data.

13. The method of claim 1, further comprising:
- creating a security report from the listing of potential vulnerabilities;
- computing a security score from the security report; and
- comparing the security score with at least one security score associated with an implementation of the computer system.

14. The method of claim 13, further comprising the steps of:
- receiving a validation policy;
- comparing the security report with the validation policy to derive a set of security data; and
- associating the security data with the image file.

15. The method of claim 14, wherein the associating step comprises creating a unique hash of the image file.

16. The method of claim 14, wherein the associating step comprises creating a signature.

* * * * *